(12) United States Patent
Bisson

(10) Patent No.: US 11,996,671 B2
(45) Date of Patent: May 28, 2024

(54) RESONANT CAVITY AND A METHOD OF MANUFACTURING THE SAME

(71) Applicant: Université de Moncton, Moncton (CA)

(72) Inventor: Jean-François Bisson, Moncton (CA)

(73) Assignee: Université de Moncton, Moncton (CA)

( * ) Notice: Subject to any disclaimer, the term of this patent is extended or adjusted under 35 U.S.C. 154(b) by 633 days.

(21) Appl. No.: 17/301,050

(22) Filed: Mar. 23, 2021

(65) Prior Publication Data
US 2022/0320816 A1    Oct. 6, 2022

(51) Int. Cl.
*H01S 3/08* (2023.01)
*H01S 3/08031* (2023.01)
*H01S 3/0941* (2006.01)
*H01S 3/16* (2006.01)

(52) U.S. Cl.
CPC ...... *H01S 3/08059* (2013.01); *H01S 3/08031* (2013.01); *H01S 3/08054* (2013.01); *H01S 3/09415* (2013.01); *H01S 3/1618* (2013.01); *H01S 3/1643* (2013.01)

(58) Field of Classification Search
CPC ............. H01S 3/08031–08036; H01S 3/08054
See application file for complete search history.

(56) References Cited

U.S. PATENT DOCUMENTS

| 3,471,799 | A | * | 10/1969 | Evtuhov | H01S 3/08031 |
| | | | | | 359/489.09 |
| 5,511,085 | A | * | 4/1996 | Marshall | H01S 3/09415 |
| | | | | | 359/326 |
| 6,047,014 | A | * | 4/2000 | Hyuga | H01S 3/08036 |
| | | | | | 372/98 |
| 2008/0304535 | A1 | | 12/2008 | Parriaux et al. | |
| 2015/0295379 | A1 | * | 10/2015 | Ozdemir | H01S 3/10092 |
| | | | | | 359/337.4 |
| 2016/0172816 | A1 | * | 6/2016 | Feng | G02B 1/002 |
| | | | | | 977/774 |

OTHER PUBLICATIONS

International Search Report and Written Opinion for PCT/CA2021/050942 dated Dec. 22, 2021.

(Continued)

*Primary Examiner* — Sean P Hagan
(74) *Attorney, Agent, or Firm* — Smart & Biggar LP

(57) ABSTRACT

A resonant cavity and a method for manufacturing the same are provided. The resonant cavity includes a first reflective surface and a second reflective surface, each of the first and second reflective surfaces providing a phase shift of a reflected electric field component of light waves oscillating along a first principal axis that differs by about π relative to a phase shift of a reflected electric field component of light waves oscillating along a second principal axis that is normal to the first principal axis. At least one of the first and second reflective surfaces having diattenuation. The first principal axis of the first reflective surface is set rotated relative to the first principal axis of the second reflective surface by about an angle $\alpha_0$ between an unbroken parity-time symmetric region and a broken parity-time symmetric region. As a result, spatial hole burning and dual mode operation can be eliminated.

14 Claims, 8 Drawing Sheets

(56) References Cited

OTHER PUBLICATIONS

M. Kang, J. Chen, and Y. D. Chong, Chiral exceptional points in metasurfaces, Phys. Rev. A 94, 033834, (2016).
A. Cerjan and S. Fan, Achieving Arbitrary Control over Pairs of Polarization States using Complex Birefringent Metamaterials, Phys. Rev. Lett. 118, 253902, (2017).
M. Kang and Y. D. Chong, Coherent optical control of polarization with a critical metasurface, Phys. Rev. A 92, 043826, (2015).
M. Lawrence, N. Xu, X. Zhang, L. Cong, J. Han, W. Zhang, and S. Zhang, Manifestation of PT Symmetry Breaking in Polarization Space with Terahertz Metasurfaces, Phys. Rev. Lett. 113, 093901 (2014).
B. Baum, M. Lawrence, D. Barton, and J. Dionne, Active polarization control with a parity-time-symmetric plasmonic resonator, Phys. Rev. B 98, 165418 (2018).
A. Mostafazadeh and S. Ozgelik, Explicit realization of pseudo Hermitian and quasi-Hermitian quantum mechanics for two-level systems, Turk. J. Phys. 30, 437 (2006).
Q. H. Wang, S. Z. Chia, and J. H. Zhang, PT-symmetry as a generalization of Hermiticity, J. Phys. A: Math. Theor. 43, 295301 (2010).
M. Born and E. Wolf, Principles of Optics, 6th ed. (Pergamon Press, Oxford, 1980).
J. F. Bisson and K. N. Amouzou, Controlling spatial hole burning in lasers using anisotropic laser mirrors, J. Opt. Soc. Amer. B36, 3322 2019.
J. J. Zayhowski, Limits imposed by spatial hole burning on the single-mode operation of standing-wave laser cavities, Opt. Lett. 15, 431 (1990).
J. Li, K. Ueda, L. Zhong, M. Musha, A. Shirakawa, and T. Sato, Efficient excitations of radially and azimuthally polarized Nd3+:YAG ceramic microchip laser by use of subwavelength multilayer concentric gratings composed of Nb2O5/SiO2, Opt. Express 16, 10841 (2008).
J.-F. Bisson, O. Parriaux, J. C. Pommier, S. Tonchev, and K. Ueda, A polarization-stabilized microchip laser using a resonant grating mirror, Appl. Phys. B 85, 519 (2006).
S. Kawakami, T. Kawashima, and T. Sato, Mechanism of shape formation of three-dimensional periodic nanostructures by bias sputtering, Appl. Phys. Lett. 74, 463 (1999).
M. Deubel, G. Von Freymann, M. Wegener, S. Pereira, K. Busch and C. M. Soukoulis, Direct laser writing of three-dimensional photonic-crystal templates for telecommunications, Nat. Mater. 3, 444 (2004).
W. A. Clarkson, Thermal effects and their mitigation in end-pumped solid-state lasers, J. Phys. D.: Appl. Phys. 34, 2381 (2001).
Zhang, Y; et al. "A diode pumped tunable single-frequency Tm: YAG laser using twisted-mode technique" Laser Phys. Lett. 7 17.
Evtuhov, V; and Siegman, A.E. A "Twised-Mode" Technique for Obtaining Axially Uniform Energy Density in a Laser Cavity, Applied Optics/vol. 4, No. 1/ Jan. 1965.
Wu, E.; et al. "High power single-longitudinal-mode operation in a twisted-mode-cavity laser with a c-cut Nd:GdVO4 crystal" Appl. Phys. B 80, 459-462 (2005).
Van der Lee, A. M.; et al.; "Excess Quantum Noise due to Nonorthogonal Polarization Modes" Physcial Review Letters vol. 79, No. 22, Dec. 1, 1997.
Polynkin, Pavel; et al. "Single-frequency laser oscillator with watts-level output power at 1.5 μm by use of a twisted-mode technique" Optics Letters vol. 30, No. 20, Oct. 15, 2005.
K. Wallmeroth and P. Peuser, "High power, CW single-frequency, TEMoo, diode-laser-pumped Nd:YAG laser" Electronics Letters, vol. 24, Issue 17, p. 1086-1088, Aug. 18, 1988.
A. M. van der Lee, N. J. van Druten, A. L. Mieremet, M. A. van Eijkelenborg, A. M. Lindberg, M. P. van Exter, and J. P. Woerdman, Excess Quantum Noise due to Nonorthogonal Polarization Modes, Phys. Rev. Lett 79 (22), 4357-4360, 1998.
J. F. Bisson, Y. C. Nonguierma, Single-mode lasers using parity-time-symmetric polarization eigenstates, Phys. Rev. A., 102, 043522, 2020.
O. Emile, M. Brunel, A. Le Floch and F. Bretenaker, Vectorial excess noise factor in common lasers, Europhys. Lett., 43 (2), pp. 153-157 (1998).
C. M. Bender and S. Boettcher, "Real Spectra in Non-Hermitian Hamiltonians having PT Symmetry", Phys. Rev. Lett. 80, 5243 (1998).
H. Hodae, M.- A. Miri, M. Heinrich, D. N. Christodoulides, and M. Khajvikhan, "Parity-time-symmetric microring laser", Science 346, 975 (2014).
L. Feng, Z. J. Wong, R. M. Ma, Y. Wang, and X. Zhang, "Single-mode laser by parity-time-symmetry breaking", Science 346, 972 (2014).
S. Pancharatnam, The propagation of light in absorbing biaxial crystals I. Theoretical, proc. Indian Acad. Sci. Sec. A 42, 86 (1955).
R. M. Oldenbeuving, E. J. Klein, H. L. Offerhaus, C. J. Lee, H. Song, and K.-J. Boller, "25 kHz narrow spectral bandwidth of a wavelength tunable diode laser with a short waveguide-based external cavity," Laser Phys. Lett. 10, 015804 (2013).
C. Wieman and T. W. Hänsch, "Doppler-free laser polarization spectroscopy," Phys. Rev. Lett. 36, 1170-1173 (1976).
I. D. Carr and D. C. Hanna, "Performance of a Nd:YAG oscillator/amplifier with phase-conjugation via stimulated Brillouin scattering," Appl. Phys. B 36, 83-92 (1985).
W. J. Kozlovsky, C. D. Nabors, and R. L. Byer, "Efficient second harmonic generation of a diode laser-pumped CW Nd: YAG laser using monolithic MgO:LiNbO3 external resonant cavities," IEEE J. Quantum Electron. 24, 913-919 (1988).
J .- M. Melkonian, T.- H. My, F. Bretenaker, and C. Drag, "High spectral purity and tunable operation of a continuous singly resonant optical parametric oscillator emitting in the red," Opt. Lett. 32, 518-520 (2007).
Y. Feng, L. R. Taylor, and D. B. Calia, "25 W Raman-fiber amplifier-based 589 nm laser for laser guide star," Opt. Express 17, 19021-19026 (2009).
K. Scholle, E. Heumann, and G. Huber, "Single mode Tm and Tm, Ho: LuAG lasers for LIDAR applications," Laser Phys. Lett. 1, 285-290 (2004).
T. Udem, R. Holzwarth, and T.W. Hansch, "Optical frequency metrology," Nature 416, 233-237 (2002).
C. H. Rowe, U. K. Schreiber, S. J. Cooper, B. T. King, M. Poulton, and G. E. Stedman, "Design and operation of a very large ring laser gyroscope," Appl. Opt. 38, 2516-2523 (1999).
C. L. Tang, H. Statz, and G. de Mars, "Spectral output and spiking behavior of solid-state lasers," J. Appl. Phys. 34, 2289-2295 (1963).
L. W. Casperson, "Laser power calculations: sources of error," Appl. Opt. 19, 422-434 (1980).
T. J. Kane and R. L. Byer, "Monolithic, unidirectional single-mode Nd:YAG ring laser," Opt. Lett. 10, 65-67 (1985).
Y. K. Park, G. Giulani, and R. L. Byer, "Stable single-axial-mode operation of an unstable-resonator Nd:YAG oscillator by injection locking," Opt. Lett. 5, 96-98 (1980).
S. A. Collins and G. R. White, "Interferometer laser mode selector," Appl. Opt. 2, 448-449 (1963).
Y. C. Chen, S. Li, K. K. Lee, and S. Zhou, "Self-stabilized single-longitudinal-mode operation in a self Q-switched Cr:Nd: YAG laser," Opt. Lett. 18, 1418-1419 (1993).
J. J. Zaihovski and A. Moradian, "Single-frequency microchip Nd lasers," Opt. Lett. 14, 24-26 (1989).
T. Taira, A. Mukai, Y. Nozawa, and T. Kobayashi, "Single-mode oscillation of laser-diode-pumped Nd:YVO4 microchip lasers," Opt. Lett. 16, 1955-1957 (1991).
V. Evtuhov and A. E. Siegman, "A twisted-mode technique for obtaining axially uniform energy density in a laser cavity," Appl. Opt. 4, 142-143 (1965).
K. Robbie and M. J. Brett, "Sculptured thin films and glancing angle deposition: growth mechanics and applications," J. Vac. Sci. Technol. A 15, 1460-1465 (1995).
Y. Zhang, C. Gao, M. Gao, Z. Lin, and R.Wang, "A diode pumped tunable single-frequency Tm:YAG laser using twisted-mode technique," Laser Phys. Lett. 7, 17-20 (2010).
T. Y. Fan and J. Ochoa, "Tunable single-frequency Yb:YAG laser with 1-W output power using the twisted-mode technique," IEEE Photon. Technol. Lett. 7, 1137-1138 (1995).

(56) References Cited

OTHER PUBLICATIONS

P. Polynkin, A. Polynkin, M. Mansuripur, J. Moloney, and N. Peyghambarian, "Single-frequency laser oscillator with watt-level output power at 1.5 m by use of a twisted-mode technique," Opt. Lett. 30, 2745-2747 (2005).

Y. Louyer, F. Balembois, M. D. Plimmer, T. Badr, P. Georges, P. Juncar, and M. E. Himbert, "Efficient cw operation of diode-pumped Nd: YLF lasers at 1312.0 and 1322.6 nm for a silver atom optical clock," Opt. Commun. 217, 357-362 (2003).

E. Wu, H. Pan, S. Zhang, and H. Zeng, "High power single-longitudinal-mode operation in a twisted-mode-cavity laser with a c-cut Nd:GdVO4 crystal," Appl. Phys. B 80, 459-462 (2005).

D. I. Chang, M. J. Guy, S. V. Chernikov, J. R. Taylor, and H. J. Kong, "Single-frequency erbium fibre laser using the twisted mode technique," Electron. Lett. 32, 1786-1787 (1996).

H. Pan, S. Xu, and H. Zeng, "Passively Q-switched single-longitudinal-mode c-cut Nd:GdVO4 laser with a twisted-mode cavity," Opt. Express 13, 2755-2760 (2005).

E. J. Hao, T. Li, H. M. Tan, L. Q. Zhang, and Y. Zhang, "Single-frequency laser at 473 nm by twisted-mode technique," Laser Phys. 19, 1953-1956 (2009).

J. F. Bisson and K. N. Amouzou, Elimination of spatial hole burning in solid-state lasers using nanostructured thin films, Appl. Opt. 59, A83 (2020).

S. Pancharatnam, "Generalized theory of interference and its applications. Part 1: Coherent pencils," Proc. Indian Acad. Sci. Sect. A 44, 247-262 (1956).

D. Vick, L. J. Friedrich, S. K. Dew, M. J. Brett, K. Robbie, M. Seto, and T. Smy, "Self-shadowing and surface diffusion effects in obliquely deposited thin films," Thin. Sol. Films 339, 88-94 (1999).

I. Hodgkinson and Q. H. Wu, "Serial bideposition of anisotropic thin films with enhanced linear birefringence," Appl. Opt. 38, 3621-3625 (1999).

J. F. Bisson, G. Cormier, A. Busungu, and K. N. Amouzou, "Improved determination of the optical constants of anisotropic thin films by ellipsometry using ant colony fitting algorithms," J. Opt. Soc. Am. B 34, 1957-1964 (2017).

A. C. van Popta, J. Cheng, J. C. Sit, and M. J. Brett, "Birefringence enhancement in annealed TiO2 thin films," J. Appl. Phys. 102, 013517 (2007).

L. F. Johnson, J. E. Geusic, and L. G. van Uitert, "Coherent oscillations from TmC3, HoC3, YbC3 and ErC3 ions in yttrium aluminum garnet," Appl. Phys. Lett. 7, 127-128 (1965).

M. Born and E. Wolf, Principles of Optics, 6th ed. (Pergamon Press Oxford, 1980).

M. Faryad and A. Lakhtakia, "The circular Bragg phenomenon," Adv. Opt. Photon. 6, 225-292 (2014).

R. El-Ganainy, K. G. Makris, M. Khajavikhan, Z. H. Musslimani, S. Rotter, and D. N. Christodoulides, Non-Hermitian physics and PT symmetry, Nat. Phys. 14, 11 (2018).

S. K. Ozdemir, R. Rotter, F. Nori, and L. Yang, Parity-time symmetry and exceptional points in photonics, Nat. Mater. 18, 783 (2019).

M. A. Miri and A. Alu, Exceptional points in optics and photonics, Science 363, eaar7709 (2019).

L. Feng, R. El-Ganainy, and L. Ge, Non-Hermitian photonics based on parity-time symmetry, Nat. Photonics 11, 752 (2017).

W. Voigt, On the behaviour of pleochroitic crystals along directions in the neighbourhood of an optic axis, Philos. Mag. 4, 90 (1902).

A. U. Hassan, B. Zhen, M. Soljacic, M. Khajavikhan, and D. N. Christodoulides, Dynamically Encircling Exceptional Points: Exact Evolution and Polarization State Conversion, Phys. Rev. Lett. 118, 093002 (2017).

S. N. Ghosh and Y. D. Chong, Exceptional points and axisymmetric mode conversion in quasi-guided dual-mode optical waveguides, Sci. Rep. 6, 19837 (2016).

\* cited by examiner

RESONANT CAVITY AND A METHOD OF MANUFACTURING THE SAME

FIELD

The specification relates generally to resonant cavities and, in particular, to a resonant cavity and a method of manufacturing the same.

BACKGROUND OF THE DISCLOSURE

Resonant cavities are known. In one particular configuration for a laser, two mirrors are positioned at opposite ends of the resonant cavity to reflect light repeatedly between them. One of the mirrors is highly reflective, and the other mirror is less reflective to enable light to escape through it. Generally, the mirrors are isotropic and can be flat or parabolic. A gain or laser medium is positioned between the mirrors, and a pump source provides energy to excite the gain medium. As the light is reflected back and forth between the mirrors, the energy is further amplified by the gain medium.

It is desired to produce a single mode with the laser, so that it emits quasi-monochromatic radiation with a very narrow linewidth. In order to achieve this, the electric field component of the light waves oscillating along a first principal axis that is perpendicular to the optical axis is phase-shifted by a half wavelength relative to the electric field component of the light waves oscillating along a second principal axis that is perpendicular to the optical axis and the first axis. This is commonly achieved by interposing a quarter-wave plate in front of each of the two mirrors in the cavity. This configuration is commonly referred to as "twisted-mode operation".

C. M. Bender and S. Boettcher, "Real Spectra in Non-Hermitian Hamiltonians having PT Symmetry", Phys. Rev. Lett. 80, 5243 (1998) showed that parity-time (PT) reflection symmetric operators can exhibit, like Hermitian systems, entirely real eigenvalue spectrum, and therefore could not be ruled out as possible representations of observables in quantum mechanics. PT-symmetric operators also exhibit spontaneous symmetry breaking when the value of some non-hermiticity parameter is exceeded. It is in the field of optics that PT-symmetric systems have the most successfully been applied. In laser science, PT-symmetry breaking was applied to generate single longitudinal mode laser operation in inhomogeneously broadened microring resonators. In H. Hodae, M.-A. Miri, M. Heinrich, D. N. Christodoulides, and M. Khajvikhan, "Parity-time-symmetric microring laser", Science 346, 975 (2014), a PT-symmetric single-mode laser was realized by carefully matching the gain of one microring laser with the loss of the other coupled resonator such that one single mode experienced enhanced amplification from PT-symmetry breaking while the other competing modes were suppressed by remaining in the unbroken PT-symmetric region. In L. Feng, Z. J. Wong, R. M. Ma, Y. Wang, and X. Zhang, "Single-mode laser by parity-time-symmetry breaking", Science 346, 972 (2014), single-mode emission was achieved by delicately manipulating the gain and loss distribution into a whispering gallery mode laser utilizing the PT-symmetry-breaking concept.

SUMMARY OF THE DISCLOSURE

In one aspect, there is provided a resonant cavity, comprising: a first reflective surface and a second reflective surface, each of the first reflective surface and the second reflective surface providing a phase shift of a reflected electric field component of light waves oscillating along a first principal axis that differs by about $\pi$ relative to a phase shift of a reflected electric field component of light waves oscillating along a second principal axis that is normal to the first principal axis, at least one of the first reflective surface and the second reflective surface having a first reflection coefficient along the first principal axis and a second reflection coefficient along the second principal axis that is normal to the first principal axis, the first reflection coefficient being greater than the second reflection coefficient, wherein the first principal axis of the first reflective surface is set rotated relative to the first principal axis of the second reflective surface by about an angle $\alpha_0$ between an unbroken parity-time symmetric region and a broken parity-time symmetric region.

The angle $\alpha_0$ can be determined by deriving a round-trip Jones matrix for the resonant cavity that satisfies:

$$(PT)J=J(PT),$$

where P is the parity-time operator and T is the time-reversal operator.

The round-trip Jones matrix can be defined as:

$$J = \begin{bmatrix} A + B\cos(\theta) - iC\sin(\theta) & (B\sin(\theta) + iC\cos(\theta) + iD)\exp(-i\varphi) \\ (B\sin(\theta) + iC\cos(\theta) - iD)\exp(i\varphi) & A - B\cos(\theta) - iC\sin(\theta) \end{bmatrix},$$

where the optical response of the first reflective surface is represented by the Jones matrix:

$$M_1 = \begin{bmatrix} r_{11} & 0 \\ 0 & r_{12} \end{bmatrix},$$

where the optical response of the second reflective surface is represented by the Jones matrix:

$$M_2 = \begin{bmatrix} r_{21} & 0 \\ 0 & r_{22} \end{bmatrix},$$

where $r_{11}$, $r_{12}$, $r_{21}$, and $r_{22}$ are real and positive, and where:

$$A = \frac{1}{4}[(r_{21} + r_{22})(r_{11} + r_{12})\cos(2\alpha) + (r_{21} - r_{22})(r_{11} - r_{12})];$$

$$B = \frac{r_{21}r_{11} - r_{22}r_{12}}{2}\cos(\alpha);$$

$$C = -\frac{1}{4}[(r_{21} + r_{22})(r_{11} + r_{12})\sin(2\alpha)];$$

$$D = \frac{r_{22}r_{11} - r_{21}r_{12}}{2}\sin(\alpha);$$

$$\theta = \frac{\pi}{2};$$

$$\varphi = 0; \text{ and}$$

$$\chi \equiv C^2/(B^2 + D^2) = 1.$$

The first principal axis of the first reflective surface can be resettable rotationally relative to the first principal axis of the second reflective surface.

The optical response of the first reflective surface can be equal to the optical response of the second reflective surface, and represented by the Jones matrix:

$$M_1 = M_2 = \begin{bmatrix} r_1 & 0 \\ 0 & r_2 \end{bmatrix},$$

and wherein the angle $\alpha_0$ is determined by:

$$\alpha_0 = \pm \arcsin\left(\frac{r_2 - r_1}{r_1 + r_2}\right).$$

The first reflective surface can have an equal reflection coefficient along the first principal axis and the second principal axis and the optical response of the first reflective surface can be represented by the Jones matrix:

$$M_1 = \begin{bmatrix} r_0 & 0 \\ 0 & r_0 \end{bmatrix},$$

wherein the second reflective surface can have a first reflection coefficient along the first principal axis and can differ from a second reflection coefficient along a second principal axis, and the optical response of the second reflective surface can be represented by the Jones matrix:

$$M_1 = \begin{bmatrix} r_1 & 0 \\ 0 & r_2 \end{bmatrix},$$

and wherein the angle $\alpha_0$ is determined by:

$$\alpha_0 = \pm \frac{1}{2} \arcsin\left(\frac{r_2 - r_1}{r_1 + r_2}\right).$$

A laser medium can be positioned between the first reflective surface and the second reflective surface.

In another aspect, there is provided a method of manufacturing a resonant cavity, comprising: positioning a first reflective surface and a second reflective surface opposite the first reflective surface, each of the first reflective surface and the second reflective surface providing a phase shift of a reflected electric field component of light waves oscillating along a first principal axis that differs by about $\pi$ relative to a phase shift provided along a second principal axis that is normal to the first principal axis, at least one of the first reflective surface and the second reflective surface having a first reflection coefficient along the first principal axis and a second reflection coefficient along the second principal axis that is normal to the first principal axis, the first reflection coefficient being greater than the second reflection coefficient, wherein the first principal axis of the first reflective surface is set rotated relative to the first principal axis of the second surface by about an angle $\alpha_0$ between an unbroken parity-time symmetric region and a broken parity-time symmetric region.

The angle $\alpha_0$ can be determined by deriving a round-trip Jones matrix for the resonant cavity that satisfies:

(PT)J=J(PT), where P is the parity-time operator and T is the time-reversal operator.

The round-trip Jones matrix can be defined as:

$$J = \begin{bmatrix} A + B\cos(\theta) - iC\sin(\theta) & (B\sin(\theta) + iC\cos(\theta) + iD)\exp(-i\varphi) \\ (B\sin(\theta) + iC\cos(\theta) - iD)\exp(i\varphi) & A - B\cos(\theta) + iC\sin(\theta) \end{bmatrix},$$

where the optical response of the first reflective surface is represented by the Jones matrix:

$$M_1 = \begin{bmatrix} r_{11} & 0 \\ 0 & r_{12} \end{bmatrix},$$

where the optical response of the second reflective surface is represented by the Jones matrix:

$$M_2 = \begin{bmatrix} r_{21} & 0 \\ 0 & r_{22} \end{bmatrix},$$

where $r_{11}$, $r_{12}$, $r_{21}$, and $r_{22}$ are real and positive, and where:

$$A = \frac{1}{4}[(r_{21} + r_{22})(r_{11} + r_{12})\cos(2\alpha) + (r_{21} - r_{22})(r_{11} - r_{12})];$$

$$B = \frac{r_{21}r_{11} - r_{22}r_{12}}{2}\cos(\alpha);$$

$$C = -\frac{1}{4}[(r_{21} + r_{22})(r_{11} + r_{12})\sin(2\alpha)];$$

$$D = \frac{r_{22}r_{11} - r_{21}r_{12}}{2}\sin(\alpha);$$

$$\theta = \frac{\pi}{2};$$

$$\varphi = 0; \text{ and}$$

$$\chi \equiv C^2/(B^2 + D^2) = 1.$$

The first principal axis of the first reflective surface can be resettable rotationally relative to the first principal axis of the second reflective surface.

The optical response of the first reflective surface can be equal to the optical response of the second reflective surface, and represented by the Jones matrix:

$$M_1 = M_2 = \begin{bmatrix} r_1 & 0 \\ 0 & r_2 \end{bmatrix},$$

and wherein the angle $\alpha_0$ can be determined by:

$$\alpha_0 = \pm \arcsin\left(\frac{r_2 - r_1}{r_1 + r_2}\right).$$

The first reflective surface can have an equal reflection coefficient along the first principal axis and the second principal axis and the optical response of the first reflective surface can be represented by the Jones matrix:

$$M_1 = \begin{bmatrix} r_0 & 0 \\ 0 & r_0 \end{bmatrix},$$

wherein the second reflective surface can have a first reflection coefficient along the first principal axis and can differ from a second reflection coefficient along a second principal axis, and the optical response of the second reflective surface can be represented by the Jones matrix:

$$M_1 = \begin{bmatrix} r_1 & 0 \\ 0 & r_2 \end{bmatrix},$$

and wherein the angle $\alpha_0$ can be determined by:

$$\alpha_0 = \pm \frac{1}{2} \arcsin\left(\frac{r_2 - r_1}{r_1 + r_2}\right).$$

The method can further comprise positioning a laser medium between the first reflective surface and the second reflective surface.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
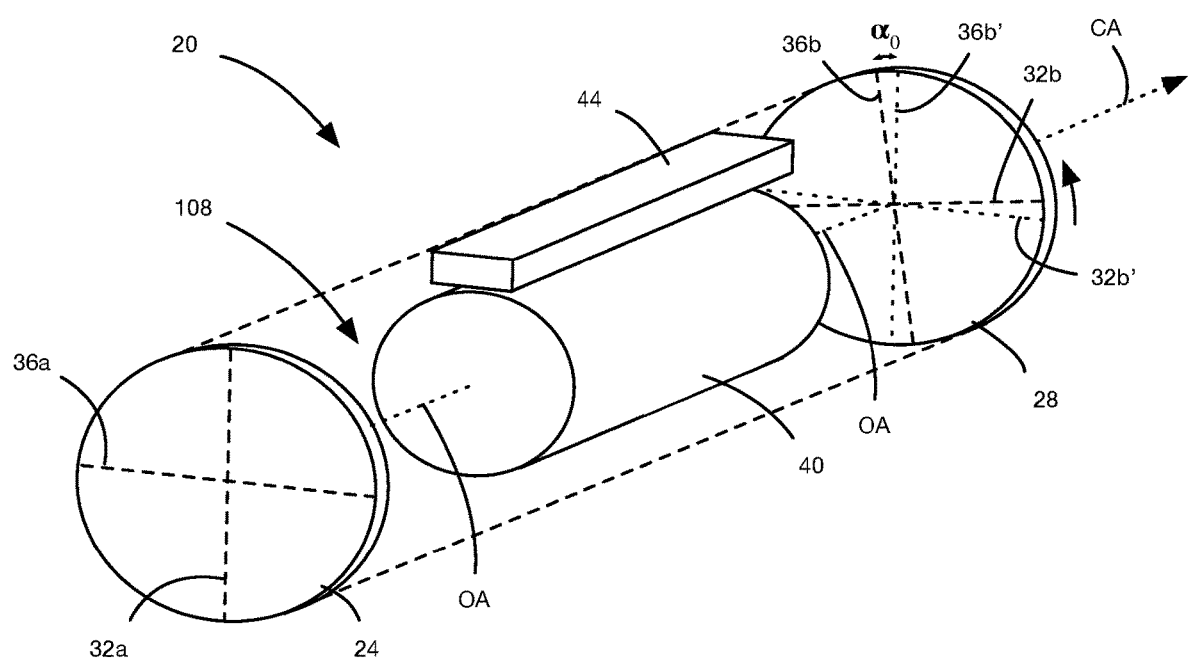
FIG. 1 shows a resonator cavity for a laser in accordance with an embodiment.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Disclosed herein is a resonator cavity and a method of producing the same. The manner by which single mode laser operation is achieved also makes use of PT-symmetry breaking but does not require a delicate manipulation of gain and loss between coupled resonators or their spatial distribution. Anisotropic laser mirrors can be used to form a laser resonator exhibiting non-Hermitian, PT-symmetric, polarization states. By adjusting the relative angle of the two mirrors, the degree of non-hermiticity can be adjusted. In the unbroken PT-symmetry regime, dual polarization oscillation is suppressed, while in the broken PT-symmetry regime, single longitudinal mode operation is achieved by eliminating the axial intensity pattern of the standing wave. The two regimes meet at the transition point between both regimes, the exceptional point (EP), enabling single frequency operation around this exceptional point.

In conventional linear laser cavity designs, the intensity pattern of the standing wave produces regularly spaced regions of undepleted inversion density that can be used by other axial modes to achieve laser oscillation despite their lower emission cross-section. This generally gives rise to undesired multiple mode operation. Inserting quarter-wave plates in front of each laser mirror eliminates the contrast of the standing wave by making counter-propagating (CP) waves orthogonal. This is the so-called twisted-mode operation, wherein the interference between CP left- or right-circularly polarized propagating eigen-waves produces a standing wave with axially uniform intensity and a linear polarization state that rotates like a twisted ribbon along the axial direction. This scheme, however, has the notorious drawback of not discriminating between the two coexisting eigen-polarization states. As a result, dual emission in both polarization states takes place, and is generally eliminated by placing a polarization-selective element between a $\lambda/4$ waveplate and a mirror.

The resonator cavity disclosed herein eliminates the competition between polarization states at the root by eliminating the very existence of dual polarization, while retaining the advantage of single longitudinal mode operation of the twisted-mode design.

The discovery of exceptional points of polarization goes back to the beginning of the $20^{th}$ century in connection to the propagation of light in absorbing biaxial crystals. This phenomenon, observed for some specific directions of light called singular axes, was correctly analyzed in S. Pancharatnam, The propagation of light in absorbing biaxial crystals I. Theoretical, proc. Indian Acad. Sci. Sec. A 42, 86 (1955). In addition to demonstrating the existence of the coalescence of eigen-states of polarization in singular directions, Pancharatnam showed that light beams with polarization states other than the eigenstate gradually transform into the eigenvector as it propagates along a singular axis. Hence, Pancharatnam's discovery really appears to be a precursor to the recently proposed omnipolarizer. The idea of PT-symmetry breaking in the polarization space is more recent and it generally aims at achieving active control of polarization, like compact polarization converters. It is generally realized with engineered metasurfaces or waveguides, wherein gain and loss are carefully balanced.

The approach employed for the resonator cavity disclosed herein can mitigate the need for exquisite adjustment of gain and loss or complex nanofabrication steps. As used herein, "resonator cavity" shall mean any container or medium within which light is reflected between two or more reflective surfaces. In contrast with previous single mode lasers based on PT-symmetry breaking, the present resonator cavity does not involve selective symmetry breaking of one mode. Indeed, the resonator cavities are designed such that only one mode strikes the right balance of gain and loss and undergoes selective symmetry breaking, thereby providing enhanced gain contrast and a mode selection mechanism. Here, the optical properties of the mirrors do not significantly change on the scale of the mode spacing, so several modes simultaneously experience the transition from unbroken to broken PT-symmetry at the exceptional point. The single mode selection is nevertheless enabled for homogeneously broadened active materials by the elimination of the axial spatial hole burning due to the orthogonality of the polarization states of the counterpropagating waves. The transition point between the two regions is identified as the privileged operation point where effective discrimination between dual polarization states and competing longitudinal modes is simultaneously achieved.

FIG. 1 shows a laser resonator cavity 20 in accordance with an embodiment. The laser resonator cavity 20 includes a first reflective surface in the form of a first mirror 24 and a second reflective surface in the form of a second mirror 28. The first mirror 24 and the second mirror 28 are positioned so that they are aligned along the optical axis OA of the resonant cavity 20. The first mirror 24 is highly reflective and redirects almost all of the energy in the resonator cavity 20 back towards the second mirror 28. The second mirror 28 is less reflective than the first mirror 24, thus enabling light to escape in the form of a laser beam having a central axis CA. At least one of the first mirror 24 and the second mirror 28 provides diattenuation; that is, has a first reflection coefficient for components of the electric field of the wave oscillating along a first principal axis 32a, 32b that is greater than a second reflection coefficient along a second principal axis 36a, 36b that is normal to the first principal axis 32a, 32b. Principal axes are specific orientations along which the polarization of the incident linearly polarized light remains unchanged after reflection. There are two such axes that lie in the plane of the reflective surface, are mutually perpendicular, and represent a reflectance behavior of the reflective surface along lines parallel to the principal axes of the reflective surfaces described herein. In this embodiment, the difference in reflectance along the principal axes of the second mirror 28 is achieved through glancing angle deposition, providing a coating on the mirrors that has a reflection coefficient of about 95% along a first principal axis and about 55% along a second principal axis that is normal to the first principal axis. In other embodiments, the diattenuation can be achieved via resonant grating mirrors or some other suitable means. In addition, each of the first mirror 24 and the second mirror 28 are birefringent; that is, they provide a phase shift of a reflected electric field component of light waves oscillating along the first principal axis that differs by about $\pi$ relative to a phase shift of a reflected electric field component of light waves oscillating along the second principal axis that is normal to the first principal axis.

The first principal axis 32b of the second mirror 28 is set rotated relative to the first principal axis 32a of the first mirror 24 by about an angle $\alpha_0$ between an unbroken parity-time symmetric region and a broken parity-time symmetric region, as will be further discussed below. Corresponding positions 32b', 36b' of the first principal axis and the second principal axis of the first mirror 24 are shown projected onto the second mirror 28.

When used herein, "mirror" may be used interchangeably with the term "reflective surface", and it will be understood that, while references are made to mirrors in many instances, other types of reflective surfaces can be employed. As used herein, "reflective surface" shall mean a surface that at least partially reflects light, and can include a mirror, a coating applied to an object, etc.

An active laser medium, or gain medium 40 is positioned along the optical axis OA of the resonator cavity 20. A pump source 44 transfers energy into the gain medium 40, which absorbs it and results in excited states of its atoms. The gain medium 40 is a source of optical gain via stimulated emission of photons through electronic or molecular transitions to a lower energy state from a higher energy state previously populated by a pump source 44. Upon sufficient excitation, stimulated emission occurs in the gain medium 40, producing light.

Now with reference to FIG. 2, a method 100 of manufacturing a resonant cavity will now be discussed. The resonator cavity made of at least one mirror with diattenuation can produce a characteristic polarization Jones matrix satisfying PT symmetry. In the method 100, the angle $\alpha_0$ between an unbroken parity-time symmetric region and a broken parity-time symmetric region is determined. First, the round-trip Jones matrix of the resonator cavity is determined (110). Next, the round-trip Jones matrix is compared with the general form of a PT-symmetric matrix for a two-by-two Jones matrix (120). This enables the identification of diattenuation and a $\pi$ phase shift between reflected electric field components of light waves oscillating along the orthogonal principal axis of each reflective surface as the critical ingredients to achieve PT-symmetric eigenpolarization states. The relative orientation of the mirrors' principal axes, $\alpha$, is also identified as a flexible control parameter that enables to continuously span the transition between unbroken and broken PT-symmetry regions. The exceptional point the angle $\alpha_0$ between an unbroken parity-time symmetric region and a broken parity-time symmetric region is then determined (130). The first and second reflective surfaces are then positioned opposite one another with their corresponding principal axes rotated relative to one another to about the exceptional point; that is, to an angle of about $\alpha_0$.

In order to derive the round-trip Jones matrix at 110, a standing wave laser resonator made of two linearly anisotropic mirrors is considered. The optical response of a non-depolarizing laser mirror can be modelled by a two-by-two Jones matrix; that is, the mirrors are represented by diagonal Jones matrices in their principal basis as:

$$M_1 = \begin{pmatrix} r_{11} & 0 \\ 0 & r_{12} \end{pmatrix}_{xy} \quad (1)$$

and $$M_2 = \begin{pmatrix} r_{21} & 0 \\ 0 & r_{22} \end{pmatrix}_{xy}, \quad (2)$$

Where each coefficient is complex. As one mirror is to be rotated with respect to the other around the resonator cavity's optical axis by some angle $\alpha$, the Jones matrix of an intra-cavity round-trip is calculated, assuming there are no polarizing element inside the resonator (thermal birefringence inside the active material is assumed negligible). For convention, an isotropic mirror is noted as:

$$\begin{pmatrix} 1 & 0 \\ 0 & -1 \end{pmatrix}_{xy \to x'y'},$$

the minus sign arising from the fact that the polarization state at reflection is expressed in new coordinates (x',y',z') where the y and z axes are reversed at the reflection. In the left-right circular basis:

$$M_1 = \frac{1}{2}\begin{pmatrix} 1 & -i \\ 1 & i \end{pmatrix}\begin{pmatrix} r_{11} & 0 \\ 0 & r_{12} \end{pmatrix}\begin{pmatrix} 1 & 1 \\ i & -i \end{pmatrix} = \frac{1}{2}\begin{pmatrix} r_{11} + r_{12} & r_{11} - r_{12} \\ r_{11} - r_{12} & r_{11} + r_{12} \end{pmatrix}_{lr} \quad (3a)$$

and $$M_2 = \frac{1}{2}\begin{pmatrix} r_{21} + r_{22} & r_{21} - r_{22} \\ r_{21} - r_{22} & r_{21} + r_{22} \end{pmatrix}_{lr}. \quad (3b)$$

Figure 2:
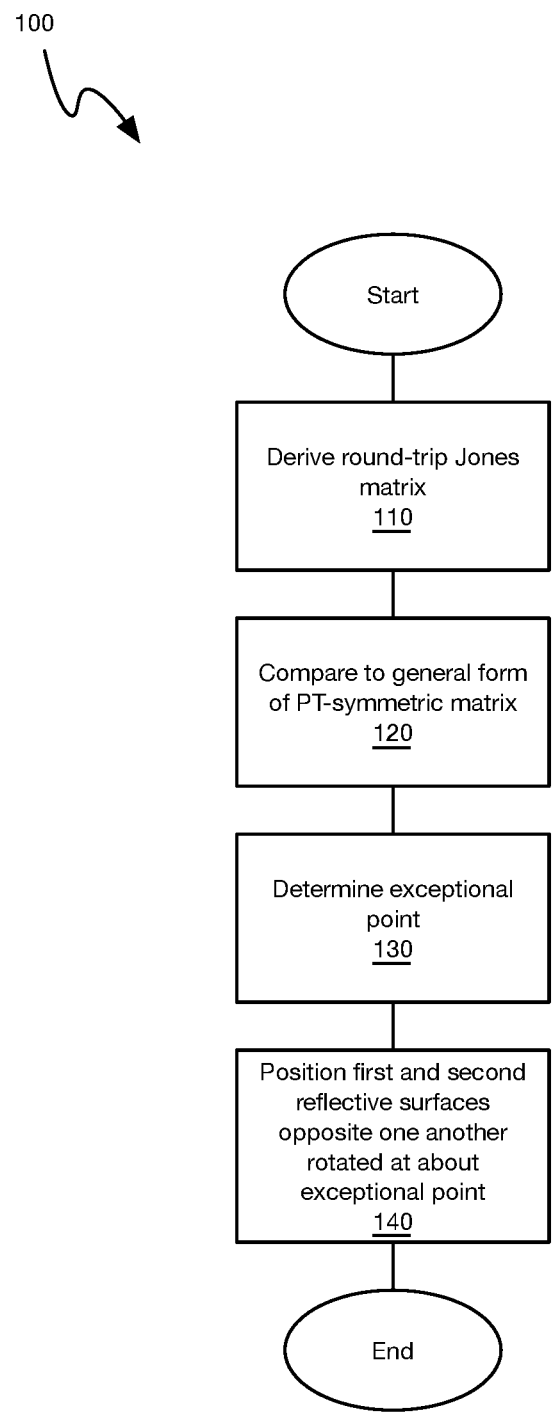
FIG. 2 is a flow chart of the general method of manufacturing the resonator cavity of FIG. 1.
Figure 3A:
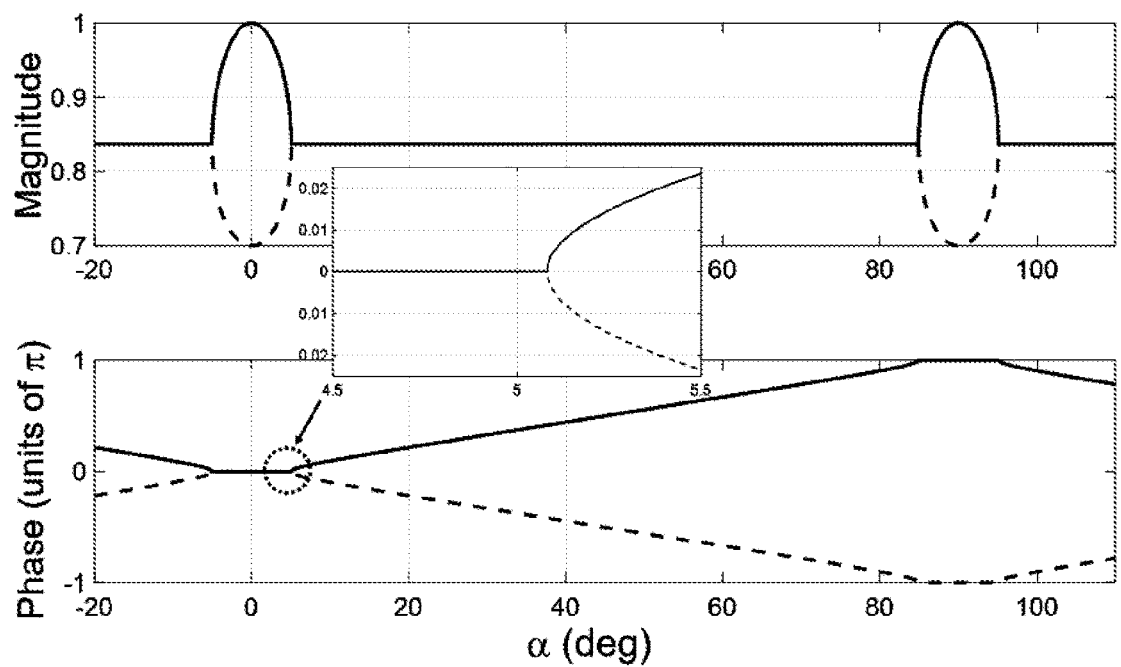
FIGS. 3A and 3B show the calculated magnitude and phase, respectively, of the eigenvalues of the Jones matrix of the round-trip of light within a resonator cavity.
Figure 3B:
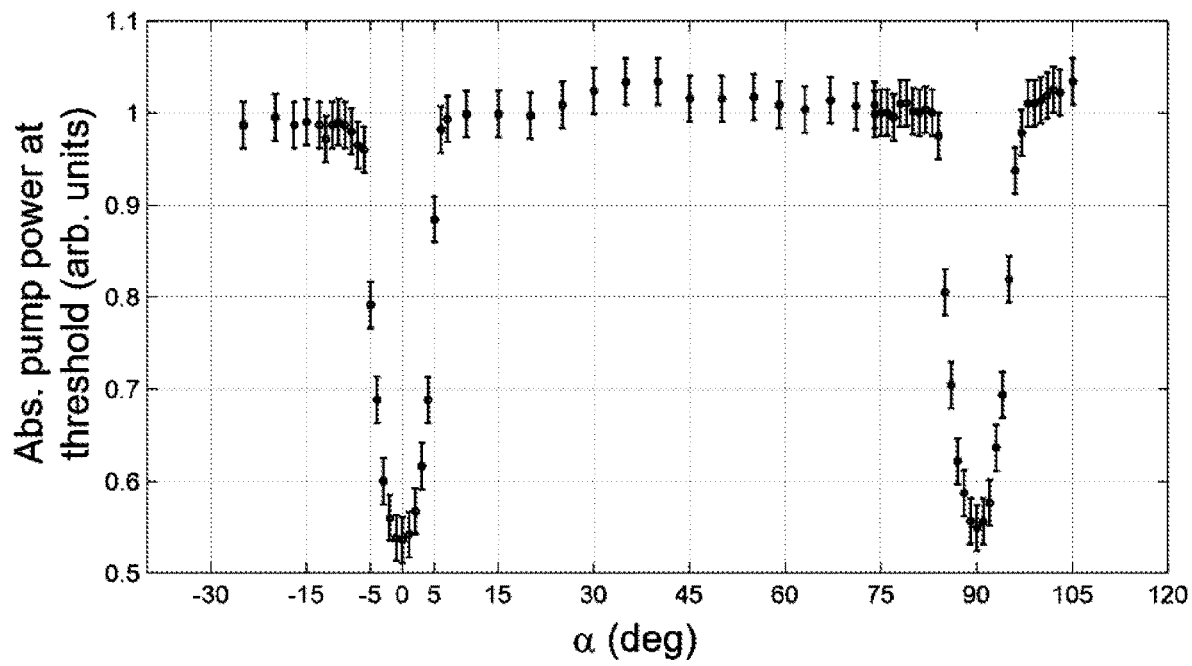

In determining 120 in the method 100 of FIG. 2, if one mirror is rotated by angle $\alpha$, with respect to the other, as shown in FIGS. 3A and 3B, then the Jones matrix for a round trip, J, is given by:

$$J = TM_2 TTM_1 T, \quad (4)$$

where T is the rotation matrix by angle $\alpha/2$, given by:

$$T(\alpha/2) = \begin{pmatrix} \exp(i\alpha/2) & 0 \\ 0 & \exp(-i\alpha/2) \end{pmatrix} \quad (5)$$

The propagation inside the resonator in free space or inside a homogeneous active material corresponds to a multiple of the identity matrix and does not play any role apart from a constant phase factor and is thus ignored. The computation of eq. (4) with eq. (3) and eq. (5) gives:

$$J = \frac{1}{4}\begin{pmatrix} (r_{21} + r_{22})(r_{11} + r_{12})\exp(2i\alpha) + (r_{21} - r_{22})(r_{11} - r_{12}) & (r_{21} + r_{22})(r_{11} - r_{12})\exp(i\alpha) + (r_{21} - r_{22})(r_{11} + r_{12})\exp(-i\alpha) \\ (r_{21} + r_{22})(r_{11} - r_{12})\exp(-i\alpha) + (r_{21} - r_{22})(r_{11} + r_{12})\exp(i\alpha) & (r_{21} + r_{22})(r_{11} + r_{12})\exp(-2i\alpha) + (r_{21} - r_{22})(r_{11} - r_{12}) \end{pmatrix}_{lr}. \quad (6)$$

Using the general form of a PT-symmetric Jones matrix and comparing it to eq. (6), the optical properties of the mirrors (i.e., the $r_{ij}$ values) can be specified and an experimentally accessible control parameter can be determined that makes it possible to continuously cover the unbroken and broken PT-symmetric regions. It is shown that such a control parameter does exist and is closely linked to the torsion angle, a.

Next, the round-trip Jones matrix is compared with the general form of a PT-symmetric matrix for a two-by-two Jones matrix at 120. A matrix J is defined as PT-symmetric if it satisfies the commutation relation:

$$(PT)J - J(PT) = 0. \tag{7}$$

where P is the parity operator and T is the time-reversal operator, defined here as the complex conjugate. The general form for a PT-symmetric two-by-two matrix is derived as:

$$J_{PT} = \begin{pmatrix} A + B\cos\theta - iC\sin\theta & (B\sin\theta + iC\cos\theta + iD)\exp(-i\varphi) \\ (B\sin\theta + iC\cos\theta - iD)\exp(i\varphi) & A - B\cos\theta + iC\sin\theta \end{pmatrix}, \tag{8}$$

where A, B, C and D can take any real value, $0 \leq \theta < \pi$ and $0 \leq \varphi < 2\pi$. The derivation presented hereinbelow is consistent with the above definition of the time-reversal operator, and is based solely on the invariance of the eigenvalues by unitary transformations of polarization states. By comparing eqs. (6) and (8), it can be seen that the round-trip operator $J_{RT}$ can be made PT-symmetric by taking all $r_{ij}$ real. The comparison gives:

$$A = \frac{1}{4}[(r_{21} + r_{22})(r_{11} + r_{12})\cos(2\alpha) + (r_{21} - r_{22})(r_{11} - r_{12})], \tag{9a}$$

$$B = \frac{r_{21}r_{11} - r_{22}r_{12}}{2}\cos\alpha, \tag{9b}$$

$$C = -\frac{1}{4}[(r_{21} + r_{22})(r_{11} + r_{12})\sin(2\alpha)], \tag{9c}$$

$$D = \frac{r_{22}r_{11} - r_{21}r_{12}}{2}\sin\alpha, \tag{9d}$$

$$\theta = \pi/2, \tag{9e}$$

$$\varphi = 0. \tag{9f}$$

J is Hermitian when C=0; hence, C determines the degree non-hermiticity. An order parameter $\chi$ can be defined as:

$$\chi = C^2/(B^2 + D^2). \tag{10}$$

The condition for unbroken symmetry, where J and PT operators share the same eigenvectors and the eigenvalues are real, is given by:

$$\chi \leq 1. \tag{11}$$

In certain configurations where the mirrors are identical, i.e., $r_{21} = r_{11} = r_1$ and $r_{22} = r_{12} = r_2$ so that $$M_1 = M_2 = \begin{pmatrix} r_1 & 0 \\ 0 & r_2 \end{pmatrix}_{xy},$$

from eqs. (9a) to (9f) and (10), $\chi$ can be determined to be:

$$\chi = \frac{(r_1 + r_2)^2 \sin^2(\alpha)}{(r_1 - r_2)^2}. \tag{12}$$

In determining the exceptional point at 130, it can be seen that the non-hermiticity is controlled by the torsion angle, $\alpha$, and the dichroism, $|r_1 - r_2|$ in this example. The transition occurs at the exceptional point, $\alpha = \alpha_{EP}$, where $\chi = 1$:

$$\alpha_{EP} = \pm\arcsin\left(\frac{r_2 - r_1}{r_1 + r_2}\right). \tag{13}$$

In certain other configurations, one of the mirrors has no diattenuation, and the Jones matrix representing the optical response can be written as $$M_1 = \begin{bmatrix} r_0 & 0 \\ 0 & r_0 \end{bmatrix},$$

and the other mirror has diattenuation, and the Jones matrix representing the optical response can be written as $$M_2 = \begin{bmatrix} r_1 & 0 \\ 0 & r_2 \end{bmatrix}.$$

The angle $\alpha_0$ is determined by:

$$\alpha_0 = \pm\frac{1}{2}\arcsin\left(\frac{r_2 - r_1}{r_1 + r_2}\right). \tag{14}$$

Note that the transition between unbroken and broken PT symmetry at the exceptional points exists only if (a) $r_1$ and $r_2$ have the same sign, which, in our convention, implies that a $\pi$ phase shift exists between reflected electric field components of light waves oscillating along orthogonal axes; and (b) $r_1 \neq r_2$, i.e., diattenuation exists.

Resonators made of mirrors without phase shift, where $r_1$ and $r_2$ take real values of opposite signs, are not of benefit despite their PT-symmetric character, because the PT-symmetry cannot be broken for any $\alpha$ value, since $\chi < 1$ for any $\alpha$. Likewise, resonators without diattenuation, where $r_1 = r_2$, are not suitable for controlling PT symmetry, since $\chi > 1$, for any $\alpha$ value, except for the trivial case, $\alpha = 0$ and $\pi/2$, where the resonator is isotropic.

In order to illustrate the principles discussed herein, an exemplary laser resonator was made of a flat rear mirror that is transparent to pump light ($\lambda = 933$ nm) and highly reflective at laser wavelength ($\lambda = 1030$ nm) and a concave output coupler with a 100-mm radius of curvature and a 92% reflectance at the laser wavelength. An antireflection-coated zero-order quarter-wave plate was placed in front of each mirror to create a $\pi$ reflection phase shift between orthogonal axes. A 1-mm thick glass plate inclined at 60° near the Brewster angle with respect to normal incidence was placed immediately in front of the output-coupler-$\lambda/4$ plate combination: the three components together simulate a deattenuating and birefringent mirror with $\pi$ phase shift with reflection matrix:

$$M_1 = \sqrt{0.92}\begin{bmatrix} 0.7 & 0 \\ 0 & 1 \end{bmatrix}, \tag{15}$$

in the horizontal-vertical basis, while the rear mirror-$\lambda/4$ combination simulates a birefringent mirror with $\pi$ phase shift of the form:

$$M_2 = \begin{bmatrix} 1 & 0 \\ 0 & 1 \end{bmatrix}, \tag{16}$$

i.e., without any dichroism, in the basis of its principal axes. The rear mirror was mounted on a rotation stage in order to control the relative orientation $\alpha$ of the two mirrors and study its effects on the laser characteristics. A 1-mm-thick, antireflection-coated, 10 at. %. $Yb^{3+}$-doped $Y_3Al_5O_{12}$ ceramic was placed between the two "mirrors" for normal incidence on top of the λ/4 waveplate of the rear mirror. The total resonator length was L≈2.5 cm. The knowledge of the free spectral range (FSR) enabled assignment of regular interference rings. The mode size of the $TEM_{00}$ Gaussian mode was estimated from the resonator geometry alone to be about $w_0$=120 μm near the rear mirror. Light emitted from a fiber-coupled laser diode emitting at 933 nm was concentrated on the active material in an end-pumped scheme using a pair of piano-convex to match the size of the $TEM_{00}$ fundamental mode inside the active medium. In order to minimize the generation of heat and thermal birefringence inside the active material, the pump was turned on during 10 μs for most experiments and this was repeated every 125 μs (8% duty cycle). Sometimes the pump pulse duration needed to be increased or decreased in order to make one of the two eigen-polarization modes to come out and lend itself to ellipsometric analysis. Part of the emitted laser radiation was sent onto a silicon-based photodetector to enable the detection of the onset of the laser oscillation. The minimum driving current of the laser diode required to obtain the laser oscillation was sought by optimizing the alignment of the cavity mirrors for every set a value. This, combined with the knowledge of the current-power characteristics and the fraction of absorbed pump power by the active element enabled plotting of the threshold absorbed pump power as a function of angle α.

For the determination of the polarization state outside the resonator, the emitted radiation was transmitted through a quarter wave plate, called a compensator, followed by a polarizer, called an analyzer, each mounted on a rotation stage that allowed adjustment of the rotation angle in order to reach as close an extinction of the transmitted beam as possible. Extinction could be obtained first by converting the generally elliptical beam into a rectilinear polarization by aligning the compensator's fast axis with one axis of the elliptical pattern of the transverse electric field vector and then by seeking extinction by rotating the analyzer. Then, the angle of the analyzer at extinction was subtracted from the angle of the fast axis of the compensator (ξ) to produce the angle ψ. Then, the x, y, z coordinates on the Poincaré coordinates were determined as:

$$\begin{pmatrix} x \\ y \\ z \end{pmatrix} = \begin{pmatrix} \cos(2\xi)\cos(2\psi) \\ \sin(2\xi)\cos(2\psi) \\ -\sin(2\psi) \end{pmatrix}. \quad (17)$$

It was found that the two states in the broken PT-symmetric region coexisted and randomly hopped from one to the other, and this coexistence enabled measurement of ξ and X separately for each of them.

The calculated external eigenstate vector was obtained by multiplying the internal eigenstate vector incident on the output coupler by matrix:

$$T_{M_1} \propto \begin{bmatrix} \sqrt{0.7} & 0 \\ 0 & -i \end{bmatrix}, \quad (18)$$

where the upper left term accounts for diattenuation and the second for the quarter wave phase advance in the y direction.

The polarization states of counter-propagating (CP) waves of each mode is also an important parameter for laser operation, because the proximity of their polarization states determines the axial intensity contrast of the standing wave pattern and the possibility of multiple longitudinal mode operation. If it is assumed that the intensity of the counter propagating waves is nearly equal, the visibility V of the interference pattern is equal to the magnitude of the Hermitian scalar product of the CP waves of each mode i:

$$V \equiv \frac{I_{max} - I_{min}}{I_{max} + I_{min}} \cong \|u_{i+}^{\dagger} u_{i-}\|, \quad (19)$$

where $u_{i+}$ and $u_{i-}$ denote the Jones vector of the mode i propagating in the positive and negative z directions and the symbol † denotes the conjugate transpose.

In the exemplary configuration, in order to analyze the emission spectrum, the unabsorbed pump light at 933 nm was first eliminated by using a low-pass filter cutting light at λ<950 nm. The emitted beam was concentrated onto a Fabry-Perot (FP) étalon (free spectral range FSR=30 GHz, finesse F=30 at 1030 nm) with a microscope objective with numerical aperture NA=0.2. A set of sharp circular interference fringes corresponding to the matching of the resonance condition of the FP etalon can be observed on a CCD camera placed at the focal plane of a f=70-mm lens. In the broken PT-symmetry region, where competing polarization states could be observed, the dual polarization operation appeared as a splitting in the frequency emission; then, the compensator and the analyzer were adjusted to select only one of the two eigenmodes. The timing of the trigger of the capture was adjusted such that the chosen mode was emitted during the capture window, which generally lasted 20 μs. At the exceptional point, the two polarization states merged together, while inside the unbroken symmetry region, only one state can oscillate, the other one being suppressed by the difference of intra-cavity loss between them.

The calculated magnitude and phase of the eigenvalues are shown in FIG. 3A as a function of a for the exemplary configuration parameters. In the unbroken PT-symmetry region, $|α|<α_{EP}$, eigenvalues are pure real numbers; one polarization state suffers higher losses than the other and is expected to be suppressed in laser operation when the saturation of the active medium takes place. In the broken PT-symmetry region, $|α|>α_{EP}$, eigenvalues are complex conjugates, which suggests that dual polarization emission will take place. The magnitude of the eigenvalue is smaller than that of the preferred polarization state in the unbroken PT-symmetry region, which implies that a lower threshold of laser oscillation should take place in the latter.

This is indeed what is experimentally found when measuring the threshold pump power for laser oscillation, as a function of α, FIG. 3B. There are two regions of unbroken symmetry corresponding to the fast axes of the quarter waveplates parallel or orthogonal. The oscillation threshold is found to be constant in the broken PT-symmetry region and sharply drops inside the PT-symmetric region, in accordance with the magnitude of the calculated eigenvalues.

Figure 4A:
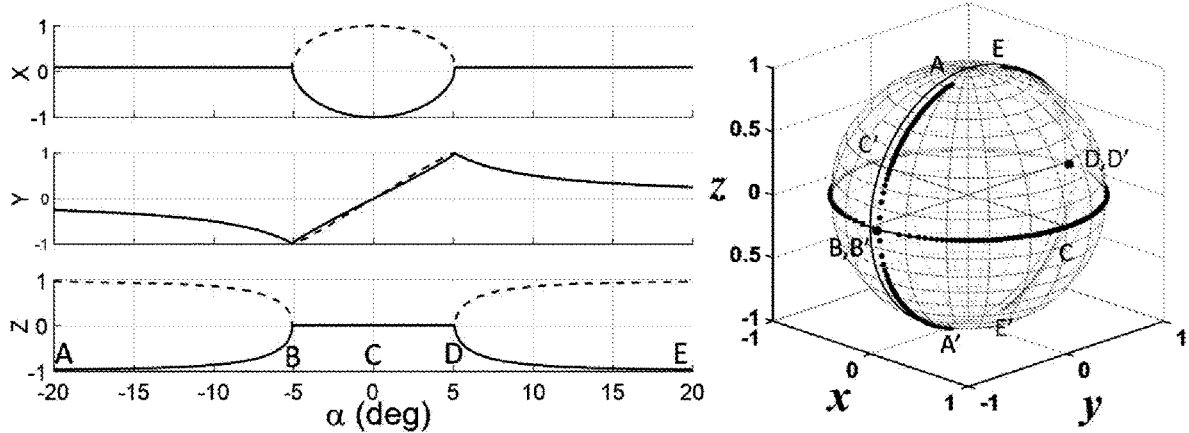
FIG. 4A shows the calculated x,y,z coordinates on the Poincare sphere of the two eigenpolarization states (solid blue and dashed red) inside the resonator for the waves heading towards the output coupler.

The calculated eigenvectors of the two modes inside the resonators are shown in FIG. 4A as (x,y,z) coordinates on the Poincare sphere. The polarization states remain rectilinear (z=0) in the unbroken PT-symmetry region and their planes of polarization rotate towards each other as α increases; then, they merge together at the EP to form a single, degenerate diagonal polarization state (x=0, y=1, z=0); afterwards, they split again in the broken symmetry region to approach circular left and right (z=±1) at larger a values.

Figure 4B:
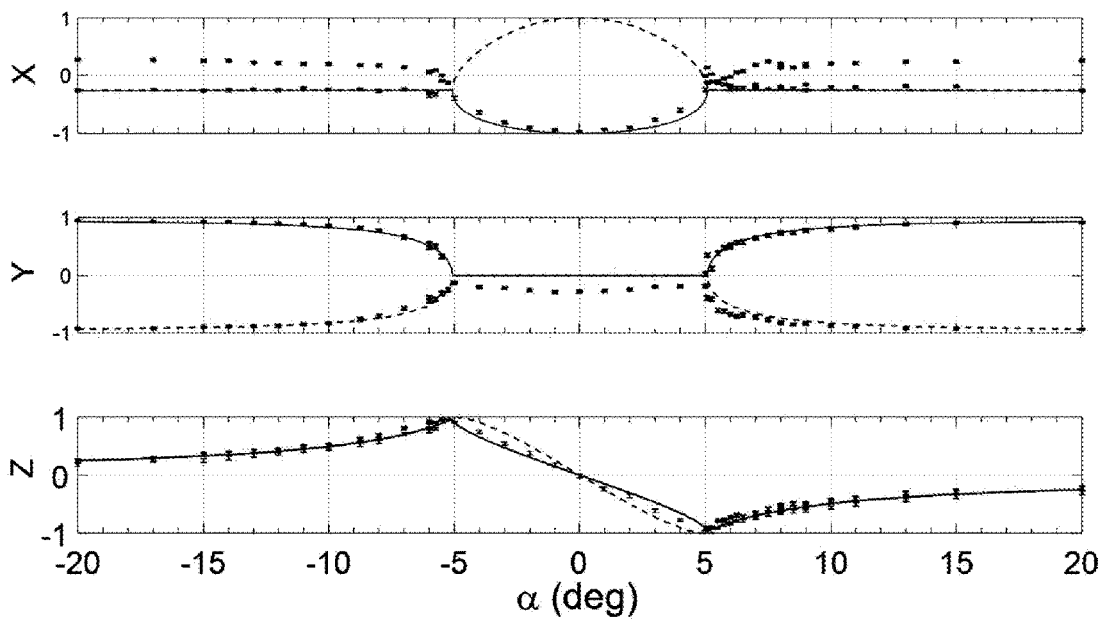
FIG. 4B shows experimental (dots) and calculated (lines) x,y,z coordinates on the Poincare sphere of the two eigenpolarization states (solid and dashed lines) of the emitted radiation outside the resonator.

The polarization states of the emitted beam were analyzed by seeking extinction with a compensator and an analyzer. As expected, only one polarization state of the emitted beam was observed in the PT-symmetric region because of the gain saturation, while the emission randomly hopped between both eigen-polarization states in the broken PT-symmetry region, allowing for the characterization of each polarization state. The data from the exemplary configuration, shown in FIG. 4B, is congruous with the theory and clearly show the coalescence of both states at the exceptional point located near $\alpha$ of plus or minus 5 degrees.

Figure 5:
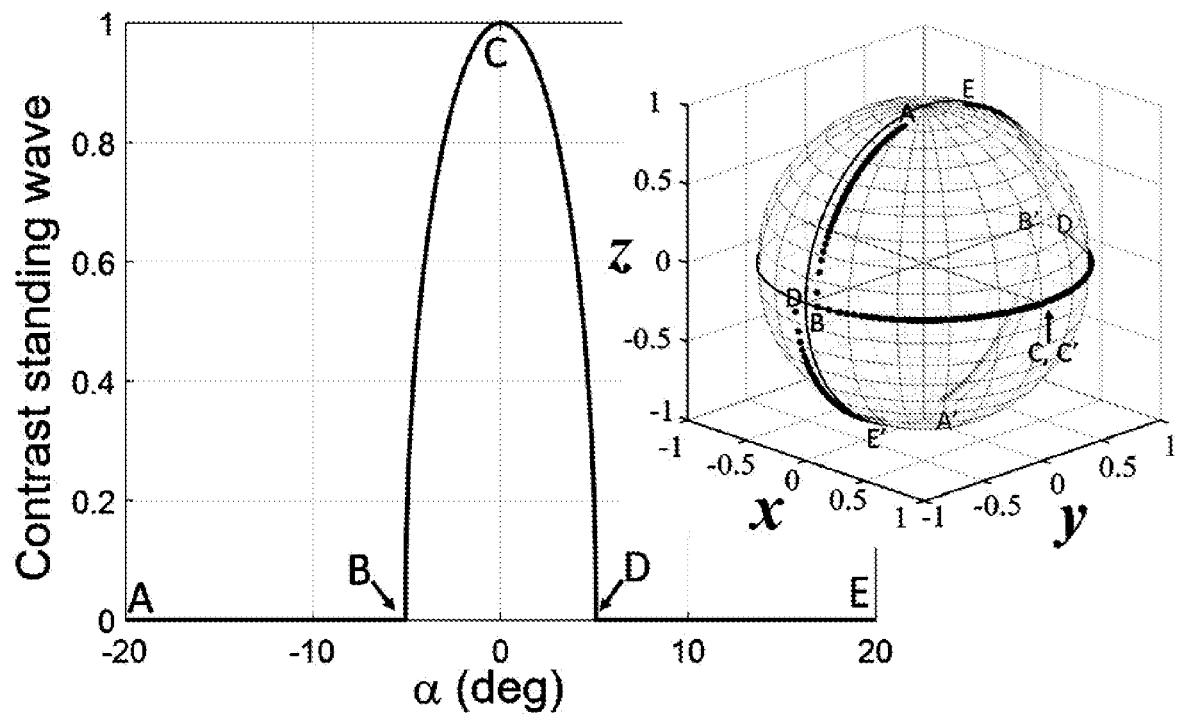
FIG. 5 shows a contrast of the standing wave, identical for each eigenmode, as a function of the angle $\alpha$.

The visibility of the interference pattern for each mode, as calculated from the magnitude of the Hermitian scalar product of the CP waves of each mode, is shown in FIG. 5 as a function of $\alpha$. The corresponding trajectories of the eigenvectors of the counterpropagating waves of one mode are shown on the Poincaré sphere in the inset of FIG. 5. The CP waves of each eigenmode, initially parallel at $\alpha=0$, become increasingly orthogonal as $|\alpha|$ increases; at the EP, the CP waves become perfectly orthogonal and remain so throughout the broken PT-symmetry region. The significance of this result is that spatial hole burning can be suppressed in the broken PT-symmetry region. Therefore, the EP appears to be a privileged operating condition where single longitudinal emission in a single polarization state can be achieved.

Figure 6A:
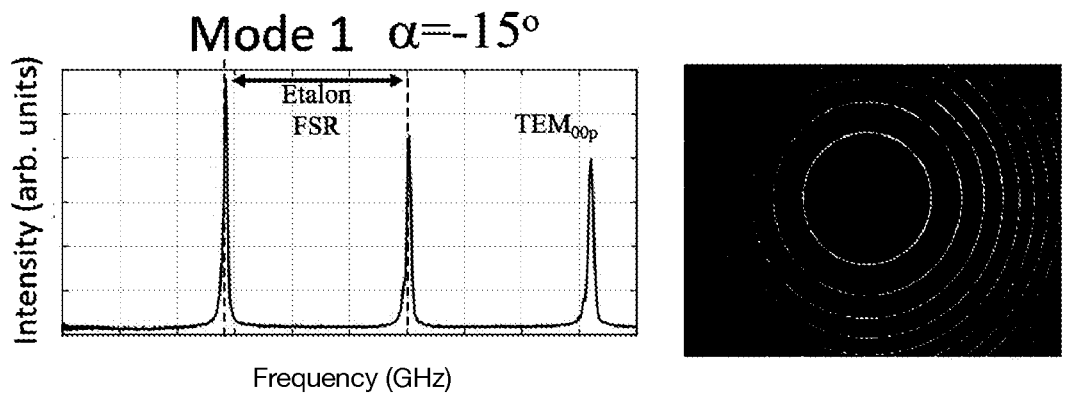
FIGS. 6A and 6B show a frequency content of the emitted beam for the broken PT-symmetric at $\alpha=-15$ degrees for both polarization eigenstates.
Figure 6B:
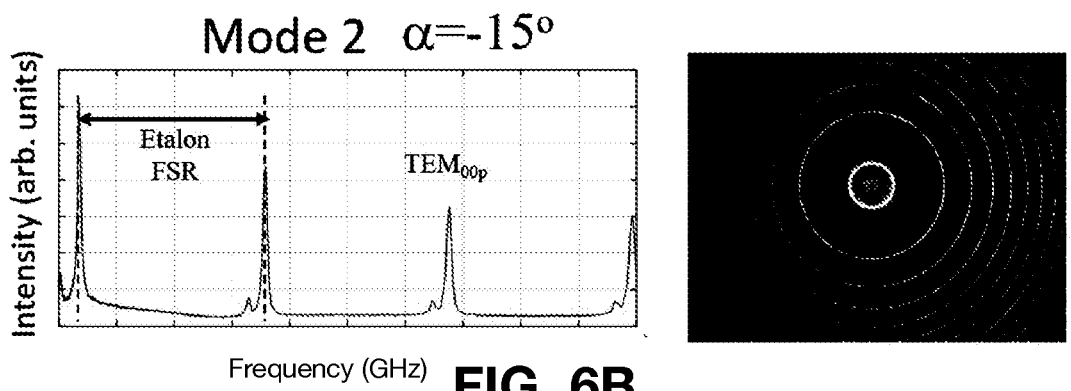
Figure 6C:
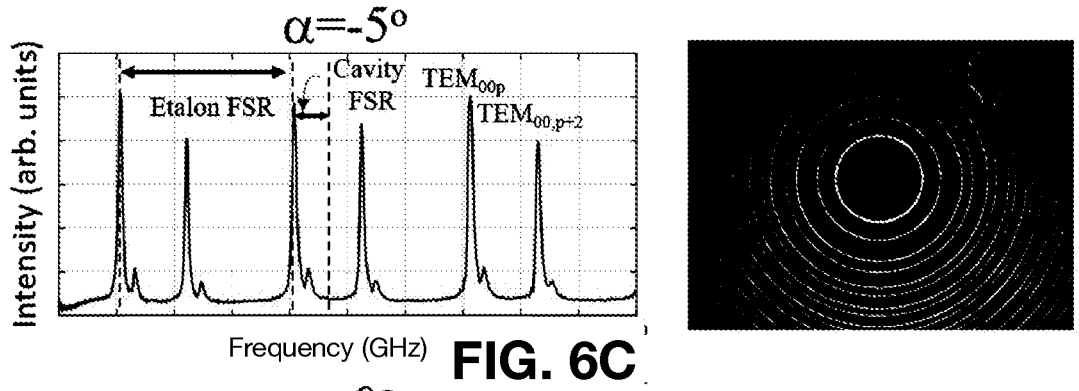
FIG. 6C shows a frequency content of the emitted beam near the exceptional point EP at $\alpha=-5$ degrees.
Figure 6D:
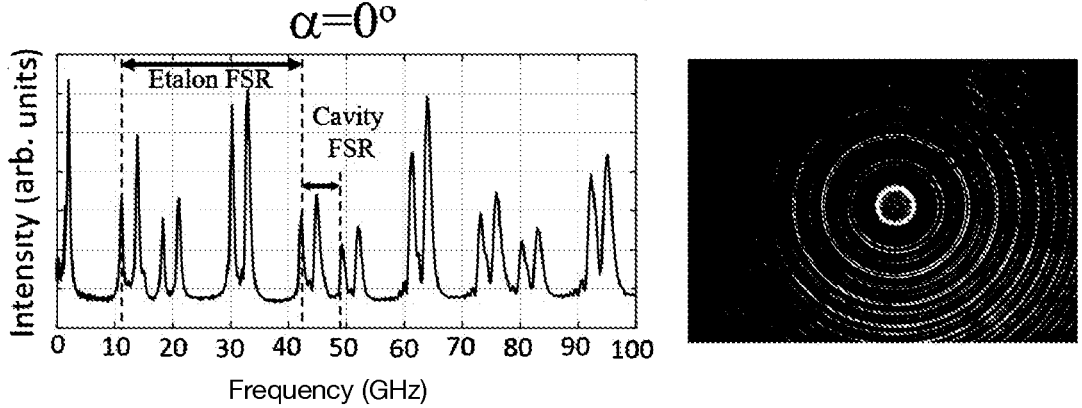
FIG. 6D shows a frequency content of the emitted beam in the unbroken symmetric region at $\alpha=0$ degrees.

The emission spectrum at different $\alpha$ values using a high finesse Fabry-Perot etalon is shown in FIGS. 6A to 6D. When multi-longitudinal mode operation took place, the frequency interval was equal to the FSR ($\approx$6 GHz), or to integral number of FRS. The transition between the multi-mode emission in the unbroken PT-symmetric region to nearly single longitudinal mode operation in the broken-symmetry region is clearly visible. In the broken symmetry region ($\alpha$=−15 degrees) shown in FIGS. 6A and 6B, each polarization state can be detected separately with our polarization analyzer but each polarization state was almost single mode. At $\alpha$=0 degrees, the emission spectrum is highly multimode but only one polarization state could be observed. Near the exceptional point ($\alpha\approx$5 degrees) shown in FIG. 6C, the emission only shows one polarization state and only two longitudinal modes could be detected. As shown in FIG. 6C, there are still some competing frequency lines; i.e., there is more than one frequency present. The reason for this is that the resonator cavity is relatively long to accommodate the intracavity elements needed to obtain the right properties in the illustrative configuration, and the frequency spacing is very small, thereby promoting the competition between modes. Reflective surfaces constructed as discussed herein enable a much shorter resonator and effectively suppress competing frequencies.

It has been shown theoretically and experimentally that PT-symmetry breaking of the polarization eigenstates can be achieved with anisotropic mirrors having both a $\pi$ phase shift between reflected electric field components of light waves oscillating along principal axes of each mirrors and diattenuation on at least one of the two mirrors. The torsion angle between the two mirrors is a versatile control parameter that enables one to probe the transition between unbroken and broken PT-symmetry near the exceptional point and control the properties of laser emission. Dual polarization oscillation is suppressed in the unbroken PT-symmetry region, while multiple longitudinal mode emission is suppressed in the broken PT-symmetry region. Single mode laser operation can be achieved at the exceptional point by suppressing dual polarization emission and axial spatial hole burning.

For alpha values with a magnitude that is smaller than the magnitude of $\alpha_0$, dual polarization emission is inhibited, while the multi-longitudinal mode emission can take place due to spatial hole burning. This gives rise to multiple lines in the emission spectrum spaced by the free spectral range of the resonator. The two eigen polarization states will suffer different losses and only the polarization eigen-state with the lower losses will oscillate. This is because the saturation of the gain medium makes the round-trip gain equal to the round-trip losses for the polarization state with lower losses, while the round-trip losses are higher than the round trip gain for the other polarization state, which is thus suppressed. Spatial hole burning, which is eliminated for a exactly equal to, or larger than, $\alpha_0$, partially appears for a values lower than $\alpha_0$, promoting multi-longitudinal mode emission.

For alpha values with a magnitude that is larger than the magnitude of $\alpha_0$, dual polarization emission does take place but single longitudinal mode emission is obtained due to the elimination of spatial hole burning. This gives rise to a pair of lines in the emission spectrum, who's spacing is determined by $\alpha$; that is, the angle of relative orientational offset of the corresponding principal axes of the reflective surfaces. However, the two eigenpolarization states have exactly the same losses and thus can both oscillate. Experimentally, the polarization either hops from one eigen state to the other or both states oscillate together.

Effective suppression of multimode emission can be achieved provided a short enough resonator is used. The influence of the characteristics of the active medium (i.e., its emission cross-section) and the length of the resonator on the maximum allowable contrast of the standing wave is illustrated in FIG. 8 of "Controlling spatial hole burning in lasers using anisotropic laser mirrors", Jean-François Bisson and Koffi Novignon Amouzou, Journal of the Optical Society of America B, 2019, while the connection between the contrast and the $\alpha$ value is shown in FIG. 5. Both pieces of information together enable a determination of the tolerance on $\alpha_0$, which can range from a fraction of a degree to more than a degree.

There are some circumstances in which it can be desirable to enable the relative rotational orientation of the two mirrors to be resettable to a different angle $\alpha$ about the exceptional point at $\alpha_0$ to enable control over the polarization state and the emission spectrum of the laser while still achieving single-mode emission. That is, the mirrors can be rotationally reoriented relative to one another and then set at a new relative rotational orientation.

The effect of a small phase shift $\varphi$ between diagonal entries of the Jones matrix was investigated:

$$\begin{pmatrix} |r_{11}| & 0 \\ 0 & |r_{12}|\exp(i\varphi) \end{pmatrix}_{xy}. \tag{20}$$

Figure 7A:
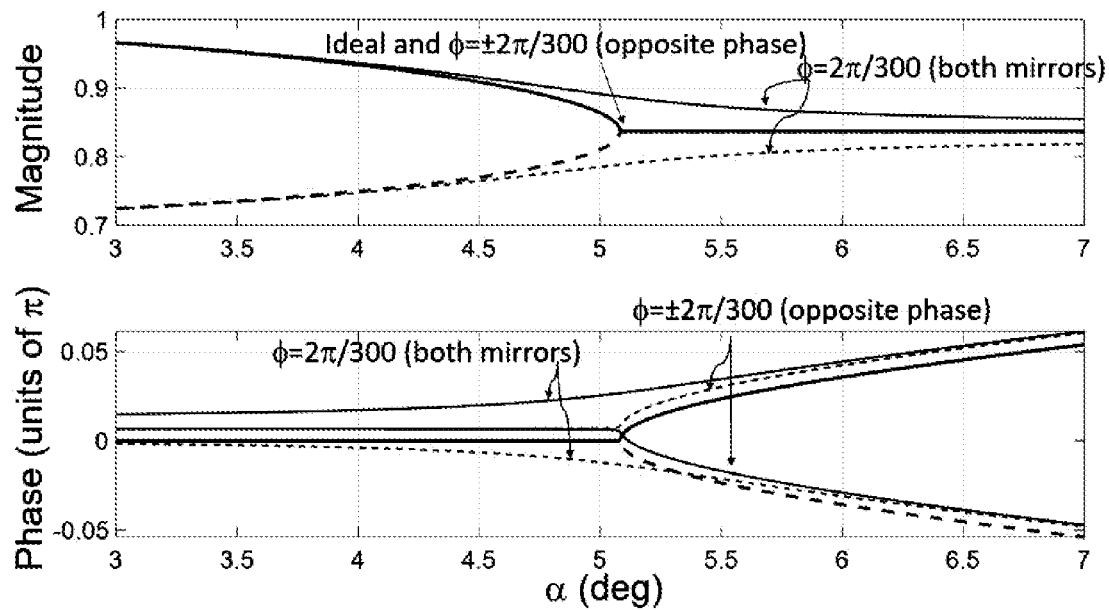
FIG. 7A shows the effect of a small error on the mirror phase shift between orthogonal directions on the eigenvalue spectrum of the round-trip Jones matrix near the transition between unbroken and broken PT symmetry for an identical error of $2\pi/300$ phase shift and for opposite phase-shift values on both mirrors.
Figure 7B:
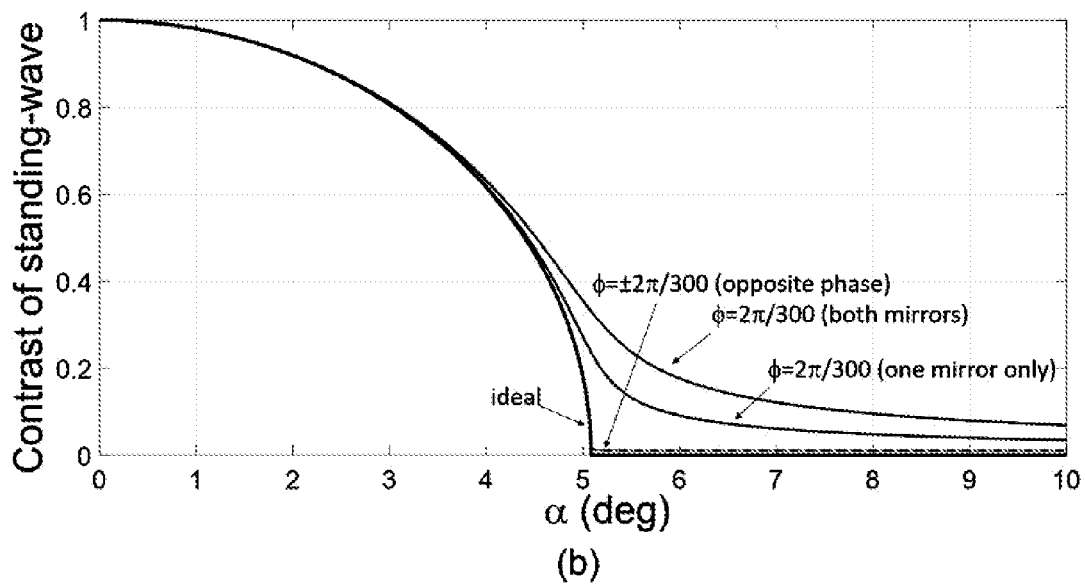
FIG. 7B shows the effect on the contrast of the standing wave for the same conditions as shown in FIG. 7A.

It appears that the PT-symmetric behavior can adversely be affected by a small $\varphi$ value. This is illustrated in FIGS. 7A and 7B for a phase shift of $2\pi/300$, corresponding to the specifications ($\Delta/4\pm\lambda/300$) of our quarter wave plates, and otherwise for our experimental conditions. The transition at the exceptional point is smoothened, the degeneracy of the eigenvalues and eigenvectors is lifted, and the counterpropagating waves of each mode are not perfectly orthogonal beyond the EP anymore. Hence, an error on the required $\pi$ phase shift between orthogonal axes of only $2\pi/300$ is sufficient to lift the degeneracy at the EP and to deteriorate the uniformity of the standing wave. However, it is also noted that using mirrors having opposite phase shifts, such as:

$$\begin{pmatrix} |r_{11}| & 0 \\ 0 & |r_{12}|\exp(i\varphi) \end{pmatrix}_{xy} \tag{21}$$

and $$\begin{pmatrix} |r_{21}|\exp(i\varphi) & 0 \\ 0 & |r_{22}| \end{pmatrix}_{xy}, \tag{22}$$

has almost no detrimental effect on the eigenvalues, eigenvectors and the contrast of the standing wave pattern, and are therefore a good approximation of PT-symmetric matrices, in comparison to FIGS. 7A and 7B. Using a shorter resonator will also relax tolerances on the mirrors' optical properties because the requirement for a uniform axial intensity pattern is not necessary to achieve single mode operation, provided the gain difference between neighboring modes is sufficient.

A phase shift of one reflective surface that is slightly different from $\pi$ can smooth the transition from unbroken to broken symmetry. For instance, the two eigen-polarization states will approach each other without exactly merging together. There will subsist a differential loss between the two polarization states, which will make oscillate only the state with lower losses, as is shown in FIG. 7A. The modulation contrast of the standing wave can also increase compared to the ideal case, as shown in FIG. 7B. A sufficiently short resonator can make the resonator immune to spatial hole burning by the mechanism outlined above. The scenario when the phase shift differs from $\pi$ is very similar to having an $\alpha$ value smaller than $\alpha_0$ with the ideal $\pi$ phase shift value.

Figure 8A:
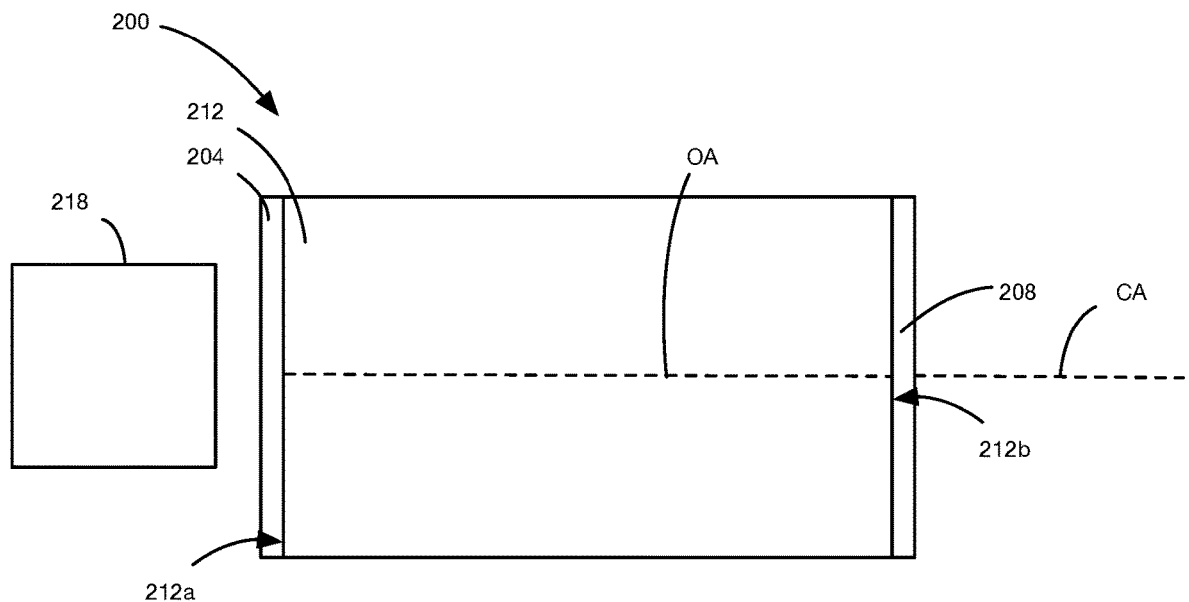
FIGS. 8A and 8B show a resonator cavity in accordance with another embodiment, wherein reflective surfaces are formed on the ends of a gain medium.
Figure 8B:
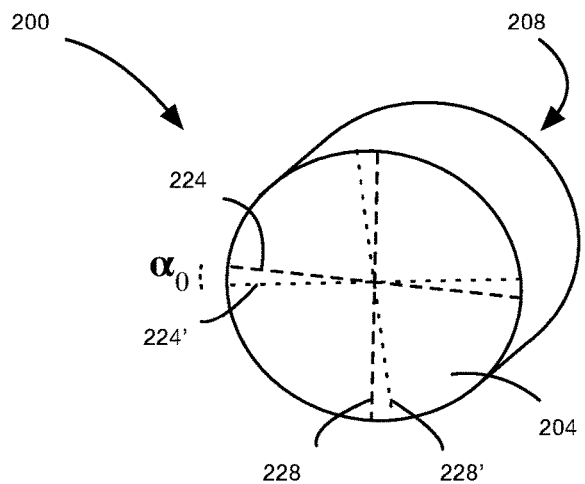

The influence of the characteristics of the active medium (i.e., its emission cross-section) and the length of the resonator on the maximum allowable contrast of the standing wave is illustrated in FIG. 8 of "Controlling spatial hole burning in lasers using anisotropic laser mirrors", Jean-François Bisson and Koffi Novignon Amouzou, Journal of the Optical Society of America B, 2019, while the connection between the contrast and the phase value is shown in FIG. 8B.

Thermally-induced birefringence was ignored in the calculations. This phenomenon arises from the heat deposited into the active material by the absorbed pump light. The inhomogeneous temperature profile produced by heat diffusion induces thermal strain inside the active material, which in turn, causes a spatially inhomogeneous thermally-induced birefringence by the photo-elastic effect. This modifies the state of polarization of light passing through the active medium in an inhomogeneous manner. Some depolarization of the emitted beam was observed by measuring the extinction ratio of each eigenmodes with the polarization analyzer. The phenomenon was expected to worsen at higher pump power, but the opposite trend was observed. In the broken PT-symmetry region, the polarization extinction ratio (PER) was measured to be around 100 just above the oscillation threshold and improved steadily at higher pump power to reach 200 at a pump power of 1.5 times the oscillation threshold. In the unbroken PT-symmetric region, the measured PER value near $\alpha=0$ degrees was in the order of 1000 just above the oscillation threshold and increased to more than 3000 at three times the threshold pump power. That the PER was much higher in the unbroken region can be explained by the observation that placing a $\lambda/4$ plate on one side of the resonator and a polarizer aligned with one axis of the $\lambda/4$ waveplate on the other side reduces depolarization losses by orders of magnitude. The mechanism is as follows: depolarization losses for horizontally polarized incident light are generally zero at 0 degrees and 90 degrees azimuthal locations around the pump axis because these positions have their principal axes of the thermally-induced birefringence aligned with the horizontal and vertical directions; conversely, the depolarization losses are usually highest in the diagonal azimuthal locations (i.e., ±45 degrees with respect to the polarizer axes). However, at those azimuthal locations, the incoming vertically polarized beam splits into equal amount of diagonal components that undergo different amounts of phase shift, but these components are exchanged by rotation of the plane of polarization by 90 degrees when traveling back and forth through the $\lambda/4$ and the phase shifts are also exchanged when passing through the active medium in the return trip, resulting into negligible depolarization losses at ±45 degrees and ±135 degrees as well. This scenario takes place here too near $\alpha=0$ because the eigenvector at 0 degrees is vertically polarized due to the presence of the Brewster plate, which acts as a polarizer; as a increases, the polarization states rotate (see FIGS. 4A and 4B) and this scheme becomes not as effective; this explains why the depolarization losses are higher in the unbroken region. The fact that the PER was high, combined with the findings from the exemplary configuration of a sharp transition at a $\alpha \approx 5$ degrees, and excellent agreement of the measured and the calculated polarization states for any $\alpha$ value support both the neglect of depolarization by thermal birefringence and it supports the model of eigenpolarization state based on the linear model described herein.

The extent to which the $\alpha$ value should match the $\alpha_0$ value to achieve single frequency emission depends mainly on the cavity length. Using a shorter resonant cavity will relax the tolerance on the birefringence and diattenuation characteristics of the reflective layers. It also reduces any detrimental effect thermal birefringence inside the active medium may have. In the experimental demonstration described above, the presence of intra-cavity elements makes the resonator rather long (L=2.5 cm, for a free spectral range of 6 GHz) and, as a result, the tiny frequency spacing between neighbouring modes promotes their competition, which materializes as mode hopping.

The use of millimeter-long microchip lasers can eliminate all of these issues. This can be achieved by the use of anisotropic thin film mirrors or nanofabrication techniques in order to get rid of the intracavity elements that are currently being using. Existing technologies such as glancing angle deposition or diffractive optical elements etched into a dielectric multilayer such as circular gratings, resonant gratings, or photonic crystals could be harnessed to realize such mirrors.

FIGS. 8A and 8B show a resonator cavity 200 in accordance with another embodiment, wherein reflective surfaces 204, 208 in the form of anisotropic thin films are formed on the end surfaces 212a, 212b of an active medium 216 by any suitable means, such as anisotropic thin film or nanofabrication. The end surfaces 212a of the active medium 216 are polished planes that are parallel to one another. The active medium 216 acts as the resonator cavity in this embodiment. A pump source 218, which is typically a laser diode, is positioned adjacent to the active medium 216. The beam of the pump source 218 is coaxial to the optical axis OA of the resonator cavity 200. In an alternative example, the pump source could be in the form of an electrical current (i.e., charge injection). The first reflective surface 204 is highly reflective and redirects almost all of the energy in the gain medium container 216 back towards the second reflective surface 208. Additionally, the first reflective surface 204 is generally transparent to the pump source 218 so that the energy transfer from the pump source 218 to the active medium 216 is relatively efficient. The second reflective surface 208 is less reflective than the first reflective surface 204, thus enabling light to escape in the form of a laser beam having a central axis CA. At least one of the first reflective surface 204 and the second reflective surface 208 provides diattenuation; that is, has a first reflection coefficient along a first principal axis 224 that is greater than a second reflection coefficient along a second principal axis 228, that is normal to the first principal axis 224. In addition, each of the first mirror 204 and the second mirror 208 provide a phase shift of a reflected electric field component of light waves oscillating along the first principal axis that differs by about π relative to a phase shift of a reflected electric field component of light waves oscillating along the second principal axis that is normal to the first principal axis. The first principal axis of the second mirror 208 is set rotated relative to the first principal axis 224 of the first mirror 24 by about an angle $\alpha_0$ between an unbroken parity-time symmetric region and a broken parity-time symmetric region. Corresponding positions 224', 228' of the first principal axis and the second principal axis of the second mirror 208 are shown projected onto the first mirror 204.

For completeness, a derivation of the general PT-symmetric matrix (eq. 8) and the control parameter χ (eq. 10) will now be discussed. A matrix J is defined as PT-symmetric if it satisfies the commutation relation:

$$(PT)J - J(PT) = 0. \tag{23}$$

where P is the parity operator and T is the time-reversal operator, defined here as taking the complex conjugate. Eq. (23) is equivalent to:

$$PJ^* = JP. \tag{24}$$

Now, it is desired to derive a general form of a PT-symmetric Jones matrix J that can be expressed in any orthogonal basis of Jones vectors. First, a particular form of the P matrix is tried:

$$P = \begin{pmatrix} 1 & 0 \\ 0 & -1 \end{pmatrix}. \tag{25}$$

This choice is justified by the generally accepted properties of a parity operator: it is Hermitian, unitary and it is an involution (i.e., it is its own inverse). If J is written in the form:

$$J = \begin{pmatrix} a & b \\ c & d \end{pmatrix}, \tag{26}$$

where a, b, c and d coefficients are complex in general; then condition of PT-symmetry, eq. (24), implies that a and d are real, and b and c are imaginary. Hence:

$$J = \begin{pmatrix} \eta & i\beta \\ i\delta & \gamma \end{pmatrix}, \tag{27}$$

where η, β, γ and δ are all real. Now, one is free to express J in any basis of one's choice. An orthogonal basis of Jones vectors can be parametrized as:

$$u_1 = \begin{pmatrix} \cos\theta/2 \\ \sin\theta/2 \exp(i\varphi) \end{pmatrix} \tag{28}$$

and $$u_2 = \begin{pmatrix} -\sin\theta/2 \\ \cos\theta/2 \exp(i\varphi) \end{pmatrix}, \tag{29}$$

where angles θ (0≤θ<π) and φ (0≤φ<2π) uniquely determine any polarization state. Hence, the corresponding unitary transformation is:

$$R = \begin{pmatrix} \cos\theta/2 & -\sin\theta/2 \\ \sin(\theta/2)\exp(i\varphi) & \cos\theta/2\exp(i\varphi) \end{pmatrix} \tag{30}$$

and we have:

$$J'(\theta, \varphi) = RJR^{-1} = \begin{pmatrix} \cos\theta/2 & -\sin\theta/2 \\ \sin(\theta/2)\exp(i\varphi) & \cos\theta/2\exp(i\varphi) \end{pmatrix} \tag{31}$$
$$\begin{pmatrix} \eta & i\beta \\ i\delta & \gamma \end{pmatrix} \begin{pmatrix} \cos\theta/2 & \sin(\theta/2)\exp(-i\varphi) \\ -\sin\theta/2 & \cos\theta/2\exp(-i\varphi) \end{pmatrix}.$$

A cumbersome but straightforward calculation of the eq. (31) gives:

$$J = \begin{pmatrix} A + B\cos\theta - iC\sin\theta & (B\sin\theta + iC\cos\theta + iD)\exp(-i\varphi) \\ (B\sin\theta + iC\cos\theta - iD)\exp(i\varphi) & A - B\cos\theta + iC\sin\theta \end{pmatrix}, \tag{32}$$

where:

$$A = \frac{\eta + \gamma}{2}, \tag{33}$$

$$B = \frac{\eta - \gamma}{2}, \tag{34}$$

$$C = \frac{\beta + \delta}{2} \tag{35}$$

and $$D = \frac{\beta - \delta}{2}. \tag{36}$$

Note that A, B, C, and D can take any real value. Note that the P matrix also changes form when using a different basis. Let P' be the P matrix in the new basis. The commutation operation eq. (24) implies that:

$$PR^{-1*}J^*R^* = R^{-1}JRP, \tag{37}$$

which in turn implies:

$$RPR^{-1*}J^* = J'RPR^{-1*}. \tag{38}$$

By comparing eq. (24) with eq. (38), it is found that:

$$P' = RPR^{-1*}. \tag{39}$$

With the chosen unitary operation R, P' becomes:

$$P' = RPR^{-1*} = \begin{pmatrix} \cos\theta & \sin\theta\exp(i\varphi) \\ \sin\theta\exp(i\varphi) & -\cos\theta\exp(2i\varphi) \end{pmatrix}. \tag{40}$$

Now, the unbroken PT symmetry corresponds to the conditions for the PT operator and J to share a common set of eigenvectors. In order to identify the constraints on the A, B, C, D parameters for the unbroken symmetry to be valid, it is convenient to choose a specific unitary transformation: that is with $\theta=0$ and $\varphi=\pi/2$ in eq. (32). One obtains:

$$J' = \begin{pmatrix} A+B & C+D \\ -C+D & A-B \end{pmatrix}, \quad (41)$$

i.e., the four entries are real without further restrictions and the corresponding P operator is:

$$P' = \begin{pmatrix} 1 & 0 \\ 0 & 1 \end{pmatrix}, \quad (42)$$

which is the identity matrix. The eigen-vectors of the P'T operator are then just those of T, the complex conjugate operator. Hence, the entries of the P'T eigenvectors are any pair of coefficients with the same phase, or equivalently, any pair of real entries with a common global phase factor. Now, it is easy to show that the condition for the eigenvectors to J' to also have pure real eigenvectors is that their eigenvalues be real. This condition is ensured by forcing the discriminant of the characteristic equation:

$$\begin{vmatrix} A+B-\lambda & C+D \\ -C+D & A-B-\lambda \end{vmatrix} = 0 \Leftrightarrow \lambda^2 - 2A\lambda + A^2 - B^2 + C^2 - D^2 = 0 \quad (43)$$

to be positive; i.e., $$B^2 - C^2 + D^2 > 0. \quad (44)$$

Defining the $\chi$ parameter as:

$$\chi = C^2/(B^2+D^2)$$

$$\chi \leq 1 \quad (45)$$

from which the condition for real eigenvalues:

$$\chi \leq 1 \quad (46)$$

directly arises. This is the general condition for the unbroken PT symmetry, since the eigenvalues are invariant by a similarity transformation. Matrix J becomes defective when $C^2 = B^2 + D^2$ and this corresponds to the exceptional point (EP) discussed in the main text. One could argue that, with the definition of eq. (40), PT is hardly a parity-time reflection symmetry operator. However, the important thing here is the condition of the existence of pure real eigenvalues and the spontaneous breaking of PT symmetry at some value of the control parameter ($\chi=1$).

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A resonant cavity, comprising:
a first reflective surface and a second reflective surface, each of the first reflective surface and the second reflective surface providing a phase shift of a reflected electric field component of light waves oscillating along a first principal axis that differs by about $\pi$ relative to a phase shift of a reflected electric field component of light waves oscillating along a second principal axis that is normal to the first principal axis, at least one of the first reflective surface and the second reflective surface having a first reflection coefficient along the first principal axis and a second reflection coefficient along the second principal axis that is normal to the first principal axis, the first reflection coefficient being greater than the second reflection coefficient,
wherein the first principal axis of the first reflective surface is set rotated relative to the first principal axis of the second reflective surface by about an angle $\alpha_0$ between an unbroken parity-time symmetric region and a broken parity-time symmetric region.

2. The resonant cavity of claim 1, wherein the angle $\alpha_0$ is determined by deriving a round-trip Jones matrix for the resonant cavity that satisfies:

$(PT)J = J(PT)$, where P is the parity-time operator and T is the time-reversal operator.

3. The resonant cavity of claim 2, wherein the round-trip Jones matrix is defined as:

$$J = \begin{bmatrix} A + B\cos(\theta) - iC\sin(\theta) & (B\sin(\theta) + iC\cos(\theta) + iD)\exp(-i\varphi) \\ (B\sin(\theta) + iC\cos(\theta) - iD)\exp(i\varphi) & A - B\cos(\theta) + iC\sin(\theta) \end{bmatrix},$$

where the optical response of the first reflective surface is represented by the Jones matrix:

$$M_1 = \begin{bmatrix} r_{11} & 0 \\ 0 & r_{12} \end{bmatrix},$$

where the optical response of the second reflective surface is represented by the Jones matrix:

$$M_2 = \begin{bmatrix} r_{21} & 0 \\ 0 & r_{22} \end{bmatrix},$$

where $r_{11}, r_{12}, r_{21}$, and $r_{22}$ are real and positive, and where:

$$A = \frac{1}{4}[(r_{21} + r_{22})(r_{11} + r_{12})\cos(2\alpha) + (r_{21} - r_{22})(r_{11} - r_{12})];$$

$$B = \frac{r_{21}r_{11} - r_{22}r_{12}}{2}\cos(\alpha);$$

$$C = -\frac{1}{4}[(r_{21} + r_{22})(r_{11} + r_{12})\sin(2\alpha)];$$

$$D = \frac{r_{22}r_{11} - r_{21}r_{12}}{2}\sin(\alpha);$$

$$\theta = \frac{\pi}{2};$$

$$\varphi = 0; \text{ and}$$

$$\chi \equiv C^2/(B^2 + D^2) = 1.$$

4. The resonant cavity of claim 3, wherein the optical response of the first reflective surface is equal to the optical response of the second reflective surface, and represented by the Jones matrix:

$$M_1 = M_2 = \begin{bmatrix} r_1 & 0 \\ 0 & r_2 \end{bmatrix},$$

and wherein the angle $\alpha_0$ is determined by:

$$\alpha_0 = \pm \arcsin\left(\frac{r_2 - r_1}{r_1 + r_2}\right).$$

5. The resonant cavity of claim 3, wherein the first reflective surface has an equal reflection coefficient along the first principal axis and the second principal axis and the optical response of the first reflective surface is represented by the Jones matrix:

$$M_1 = \begin{bmatrix} r_0 & 0 \\ 0 & r_0 \end{bmatrix},$$

wherein the second reflective surface has a first reflection coefficient along the first principal axis and differs from a second reflection coefficient along a second principal axis, and the optical response of the second reflective surface is represented by the Jones matrix:

$$M_1 = \begin{bmatrix} r_1 & 0 \\ 0 & r_2 \end{bmatrix},$$

and wherein the angle $\alpha_0$ is determined by:

$$\alpha_0 = \pm \frac{1}{2}\arcsin\left(\frac{r_2 - r_1}{r_1 + r_2}\right).$$

6. The resonant cavity of claim 1, wherein the first principal axis of the first reflective surface is resettable rotationally relative to the first principal axis of the second reflective surface.

7. The resonant cavity of claim 1, wherein a laser medium is positioned between the first reflective surface and the second reflective surface.

8. A method of manufacturing a resonant cavity, comprising:
  positioning a first reflective surface and a second reflective surface opposite the first reflective surface, each of the first reflective surface and the second reflective surface providing a phase shift of a reflected electric field component of light waves oscillating along a first principal axis that differs by about $\pi$ relative to a phase shift of a reflected electric field component of light waves oscillating along a second principal axis that is normal to the first principal axis, at least one of the first reflective surface and the second reflective surface having a first reflection coefficient along the first principal axis and a second reflection coefficient along the second principal axis that is normal to the first principal axis, the first reflection coefficient being greater than the second reflection coefficient,
  wherein the first principal axis of the first reflective surface is set rotated relative to the first principal axis of the second reflective surface by about an angle $\alpha_0$ between an unbroken parity-time symmetric region and a broken parity-time symmetric region.

9. The method of claim 8, wherein the angle $\alpha_0$ is determined by deriving a round-trip Jones matrix for the resonant cavity that satisfies:

$(PT)J=J(PT),$ where P is the parity-time operator and T is the time-reversal operator.

10. The method of claim 9, wherein the round-trip Jones matrix is defined as:

$$J = \begin{bmatrix} A + B\cos(\theta) - iC\sin(\theta) & (B\sin(\theta) + iC\cos(\theta) + iD)\exp(-i\varphi) \\ (B\sin(\theta) + iC\cos(\theta) - iD)\exp(i\varphi) & A - B\cos(\theta) + iC\sin(\theta) \end{bmatrix},$$

where the optical response of the first reflective surface is represented by the Jones matrix:

$$M_1 = \begin{bmatrix} r_{11} & 0 \\ 0 & r_{12} \end{bmatrix},$$

where the optical response of the second reflective surface is represented by the Jones matrix:

$$M_2 = \begin{bmatrix} r_{21} & 0 \\ 0 & r_{22} \end{bmatrix},$$

where $r_{11}, r_{12}, r_{21},$ and $r_{22}$ are real and positive, and where:

$$A = \frac{1}{4}[(r_{21} + r_{22})(r_{11} + r_{12})\cos(2\alpha) + (r_{21} - r_{22})(r_{11} - r_{12})];$$

$$B = \frac{r_{21}r_{11} - r_{22}r_{12}}{2}\cos(\alpha);$$

$$C = -\frac{1}{4}[(r_{21} + r_{22})(r_{11} + r_{12})\sin(2\alpha)];$$

$$D = \frac{r_{22}r_{11} - r_{21}r_{12}}{2}\sin(\alpha);$$

$$\theta = \frac{\pi}{2};$$

$$\varphi = 0; \text{ and}$$

$$\chi \equiv C^2/(B^2 + D^2) = 1.$$

11. The method of claim 10, wherein the first reflective surface has an equal reflection coefficient along the first principal axis and the second principal axis and the optical response of the first reflective surface is represented by the Jones matrix:

$$M_1 = \begin{bmatrix} r_0 & 0 \\ 0 & r_0 \end{bmatrix},$$

wherein the second reflective surface has a first reflection coefficient along the first principal axis and differs from a second reflection coefficient along a second principal axis, and the optical response of the second reflective surface is represented by the Jones matrix:

$$M_1 = \begin{bmatrix} r_1 & 0 \\ 0 & r_2 \end{bmatrix},$$

wherein the angle $\alpha_0$ is determined by:

$$\alpha_0 = \pm \frac{1}{2}\arcsin\left(\frac{r_2 - r_1}{r_1 + r_2}\right).$$

12. The method of claim 10, wherein the optical response of the first reflective surface is equal to the optical response of the second reflective surface, and represented by the Jones matrix:

$$M_1 = M_2 = \begin{bmatrix} r_1 & 0 \\ 0 & r_2 \end{bmatrix},$$

wherein the angle $\alpha_0$ is determined by:

$$\alpha_0 = \pm \arcsin\left(\frac{r_2 - r_1}{r_1 + r_2}\right).$$

13. The method of claim 8, wherein the first principal axis of the first reflective surface is resettable rotationally relative to the first principal axis of the second reflective surface.

14. The method of claim 8, further comprising positioning a laser medium between the first reflective surface and the second reflective surface.

* * * * *